US012073653B2

(12) United States Patent
Asukai

(10) Patent No.: US 12,073,653 B2
(45) Date of Patent: Aug. 27, 2024

(54) INFORMATION PROCESSING SYSTEM, STORAGE MEDIUM, AND INFORMATION PROCESSING METHOD

(71) Applicant: SONY GROUP CORPORATION, Tokyo (JP)

(72) Inventor: Masamichi Asukai, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 147 days.

(21) Appl. No.: 17/228,881

(22) Filed: Apr. 13, 2021

(65) Prior Publication Data
US 2021/0232807 A1 Jul. 29, 2021

Related U.S. Application Data

(63) Continuation of application No. 16/308,630, filed as application No. PCT/JP2017/010393 on Mar. 15, 2017, now Pat. No. 11,003,894.

(30) Foreign Application Priority Data

Jun. 27, 2016 (JP) ................. 2016-126499

(51) Int. Cl.
*G06V 40/16* (2022.01)
*G06F 16/58* (2019.01)
(Continued)

(52) U.S. Cl.
CPC ........ *G06V 40/171* (2022.01); *G06F 16/5866* (2019.01); *G06F 16/90332* (2019.01);
(Continued)

(58) Field of Classification Search
CPC ........... G06F 16/5866; G06F 16/90332; G06F 16/144; G06Q 50/10; G06Q 50/22;
(Continued)

(56) References Cited

U.S. PATENT DOCUMENTS 6,526,395 B1 * 2/2003 Morris .................. G06N 3/004
706/15
6,721,706 B1 * 4/2004 Strubbe .................. G10L 15/22
704/E15.04
(Continued)

FOREIGN PATENT DOCUMENTS

CA 2932528 A1 6/2015
CN 104836914 A 8/2015
(Continued)

OTHER PUBLICATIONS

Seelye et al. ("Application of Cognitive Rehabilitation Theory to the Development of Smart Prompting Technologies," IEEE Reviews in Biomedical Engineering ( vol. 5); Date of Publication: Apr. 26, 2012) (Year: 2012).*
(Continued)

*Primary Examiner* — Manav Seth
(74) *Attorney, Agent, or Firm* — CHIP LAW GROUP

(57) ABSTRACT

A control section is included, the control section including an accumulation function of, when recognizing a specific user on a basis of sensor data acquired via an agent device, generating episode data in the accumulation section on a basis of a keyword extracted from the sensor data, generating a question for drawing out information concerning the episode data, and accumulating a reply from the specific user to the question in the episode data, and a responding function of, when recognizing the specific user on the basis of the sensor data acquired via the agent device, retrieving the episode data through the accumulation section on the basis of the keyword extracted from the sensor data, and generating response data concerning the retrieved episode data for the agent device to respond to the specific user.

21 Claims, 16 Drawing Sheets

(51) Int. Cl.
*G06F 16/9032* (2019.01)
*G06Q 50/10* (2012.01)
*G06Q 50/22* (2018.01)
*G09B 5/06* (2006.01)
*G09B 7/02* (2006.01)
*G09B 19/00* (2006.01)
*G06F 16/14* (2019.01)

(52) U.S. Cl.
CPC ............ *G06Q 50/10* (2013.01); *G06Q 50/22* (2013.01); *G06V 40/172* (2022.01); *G06V 40/174* (2022.01); *G09B 5/06* (2013.01); *G09B 7/02* (2013.01); *G09B 19/00* (2013.01); *G06F 16/144* (2019.01); *G06V 40/173* (2022.01)

(58) Field of Classification Search
CPC . G09B 5/06; G09B 7/02; G09B 19/00; G06V 40/171–174
See application file for complete search history.

(56) References Cited

U.S. PATENT DOCUMENTS

| | | | | |
|---|---|---|---|---|
| 11,183,187 | B2* | 11/2021 | Sugiyama | G06F 40/205 |
| 2002/0013641 | A1* | 1/2002 | Nourbakhsh | G06N 3/008 |
| | | | | 701/410 |
| 2003/0074337 | A1* | 4/2003 | Sadakuni | F02M 69/045 |
| | | | | 706/11 |
| 2003/0128123 | A1* | 7/2003 | Sumiya | G08B 25/006 |
| | | | | 340/539.18 |
| 2005/0102246 | A1* | 5/2005 | Movellan | G06N 3/004 |
| | | | | 706/12 |
| 2005/0204378 | A1* | 9/2005 | Gabay | G06Q 30/0203 |
| | | | | 725/135 |
| 2006/0036536 | A1* | 2/2006 | Williams | G06Q 20/102 |
| | | | | 705/40 |
| 2006/0200260 | A1* | 9/2006 | Hoffberg | G05B 15/02 |
| | | | | 700/86 |
| 2007/0061759 | A1* | 3/2007 | Klein, Jr. | G06F 16/634 |
| | | | | 700/91 |
| 2007/0183633 | A1* | 8/2007 | Hoffmann | G06V 40/16 |
| | | | | 382/116 |
| 2009/0076845 | A1* | 3/2009 | Bellin | G16H 40/20 |
| | | | | 715/781 |
| 2010/0022279 | A1* | 1/2010 | Hoberg | H04M 3/02 |
| | | | | 455/567 |
| 2010/0211407 | A1* | 8/2010 | Duke | G06Q 50/24 |
| | | | | 705/3 |
| 2010/0241903 | A1* | 9/2010 | Goldszmidt | H04L 41/0681 |
| | | | | 714/E11.178 |
| 2011/0099153 | A1* | 4/2011 | Barraclough | G06Q 10/109 |
| | | | | 707/783 |
| 2011/0144804 | A1* | 6/2011 | Song | B25J 11/0015 |
| | | | | 706/2 |
| 2012/0216260 | A1* | 8/2012 | Crawford | G06F 21/31 |
| | | | | 726/5 |
| 2013/0014055 | A1* | 1/2013 | Song | G09B 19/00 |
| | | | | 715/810 |
| 2013/0238540 | A1* | 9/2013 | O'Donoghue | G06Q 30/0269 |
| | | | | 706/46 |
| 2013/0337421 | A1* | 12/2013 | Gerken, III | G09B 5/06 |
| | | | | 434/236 |
| 2014/0278057 | A1* | 9/2014 | Berns | G01C 21/3484 |
| | | | | 701/410 |
| 2014/0280296 | A1* | 9/2014 | Johnston | G06F 9/453 |
| | | | | 707/769 |
| 2015/0278285 | A1* | 10/2015 | Meng | G06F 16/24578 |
| | | | | 707/690 |
| 2016/0063874 | A1* | 3/2016 | Czerwinski | G06Q 10/107 |
| | | | | 434/236 |
| 2016/0094491 | A1* | 3/2016 | Fedorov | H04L 12/56 |
| | | | | 709/206 |
| 2016/0342317 | A1* | 11/2016 | Lim | G10L 15/1822 |
| 2016/0354165 | A1* | 12/2016 | Uenoyama | A61B 34/30 |
| 2017/0024656 | A1* | 1/2017 | Gilon | G16H 20/10 |
| 2017/0061955 | A1* | 3/2017 | Gueta | H04M 1/724 |
| 2017/0163471 | A1* | 6/2017 | Zheng | G06Q 50/01 |
| 2017/0193787 | A1* | 7/2017 | Devdas | G08B 25/005 |
| 2018/0047029 | A1* | 2/2018 | Saso | G06Q 30/016 |

FOREIGN PATENT DOCUMENTS

| | | | | |
|---|---|---|---|---|
| EP | 3086278 | A1 | 10/2016 | |
| JP | 2006123153 | A | 5/2006 | |
| JP | 2008-125815 | A | 6/2008 | |
| JP | 2009-271785 | A | 11/2009 | |
| JP | 2009271785 | A * | 11/2009 | |
| JP | 2010-092358 | A | 4/2010 | |
| JP | 2012-048333 | A | 3/2012 | |
| JP | 2012-178092 | A | 9/2012 | |
| JP | 2012178092 | A * | 9/2012 | |
| JP | 2015-192844 | A | 11/2015 | |
| JP | 2014-176963 | A | 9/2017 | |
| KR | 10-2016-0099552 | A | 8/2016 | |
| WO | WO-0079361 | A2 * | 12/2000 | G06Q 10/02 |
| WO | 2015/093382 | A1 | 6/2015 | |

OTHER PUBLICATIONS

International Search Report and Written Opinion of PCT Application No. PCT/JP2017/010393, issued on May 9, 2017, 08 pages of English Translation and 07 pages of ISRWO.
Notice of Allowance for U.S. Appl. No. 16/308,630, issued on Jan. 15, 2021, 12 pages.
Non-Final Office Action for U.S. Appl. No. 16/308,630, issued on Aug. 5, 2020, 31 pages.
International Preliminary Report on Patentability of PCT Application No. PCT/JP2017/010393, issued on Jan. 1, 2019, 09 pages of English Translation and 04 pages of IPRP.

* cited by examiner

FIG. 4

| QUESTION ID | CONDITION | QUESTION SENTENCE |
|---|---|---|
| F00 | (AT TIME OF INITIAL START-UP) | Nice to meet you. What is your name?<br>  <Name/first name>, what should I call you?<br>  <Name/nickname>, when is your birthday?<br>  <Name/nickname>, how old are you?<br>Thank you, <Name/nickname>! |
| F01 | NO CHARACTER IN EPISODE | Whom are you talking about? |
| F02 | NO PLACE IN EPISODE | Where are you talking about? |
| F03 | NO DATE AND TIME IN EPISODE | When are you talking about? |
| F04 | EVENT IN EPISODE = 0 | What is the story? |
| F05 | EVENT IN EPISODE < 3 | Tell me more! |
| F06 | — | And then?<br>I see!<br>Uh-huh. |
| F07 | CRIED | He cried |
| F08 | HAD FUN | He had fun |
| ... | ... | ... |

FIG. 5

| EPISODE ID | ITEM | VALUE |
|---|---|---|
| E01 | CHARACTERS | P01, P02 |
| | PLACE | A01 |
| | DATE AND TIME | 1965 |
| | EVENT | He played with a ball.<br>He used to cry because the ball he had missed rolled far.<br>I bought him ice cream and went home eating it. |
| | MEDIA DATA | — |
| E02 | CHARACTERS | P01, P02, P03, P04 |
| | PLACE | A02 |
| | DATE AND TIME | 1970 |
| | EVENT | We took a cruise ship.<br>He was singing the children's song "Sea" loudly.(sea.mp3)<br>I was asked "What is that white mountain?"(fuji.jpg) |
| | MEDIA DATA | sea.mp3, fuji.jpg |
| ... | ... | ... |

FIG. 6

| PERSON ID | ITEM | | VALUE |
|---|---|---|---|
| P01 | NAME | SURNAME | SAKURADA |
| | | FIRST NAME | YONEKO |
| | | NICKNAME | YONE |
| | DATE OF BIRTH | | JULY 8, 1936 |
| | RELATION | | HERSELF |
| | IMAGE | | P01_1.jpg |
| P02 | NAME | SURNAME | SAKURADA |
| | | FIRST NAME | TARO |
| | | NICKNAME | HER SON |
| | DATE OF BIRTH | | JULY 8, 1960 |
| | RELATION | | SON |
| | IMAGE | | P02_1.jpg, P02_2.jpg |
| ... | ... | | ... |

FIG. 7

| PLACE ID | ITEM | VALUE |
|---|---|---|
| A01 | NAME | C PARK |
| | TYPE | PARK |
| | LATITUDE AND LONGITUDE | — |
| A02 | NAME | LAKE D |
| | TYPE | LAKE, SIGHTSEEING SPOT |
| | LATITUDE AND LONGITUDE | 35.209567<br>139.003463 |
| ... | ... | ... |

FIG. 12

| EPISODE ID | ITEM | VALUE |
|---|---|---|
| E01 | CHARACTERS | P01, P02 |
| | PLACE | A01 |
| | DATE AND TIME | 1965 |
| | EMOTION | 0.6 |
| | EVENT | He played with a ball. He used to cry because the ball he had missed rolled far. I bought him ice cream and went home eating it. |
| E02 | CHARACTERS | P01, P02, P03, P04 |
| | PLACE | A02 |
| | DATE AND TIME | 1970 |
| | EMOTION | 0.8 |
| | EVENT | We took a cruise ship. He was singing the children's song "Sea" loudly. I was asked "What is that white mountain?" |
| E03 | CHARACTERS | P01, P05 |
| | PLACE | A02 |
| | DATE AND TIME | 2002 |
| | EMOTION | 0.1 |
| | EVENT | It was a trip with a friend of mine that I was looking forward to. We had a fuss about which to take, a cruise ship or a ropeway. We got strained, and I could not enjoy a luxurious dinner. |
| ... | ... | ... |

INFORMATION PROCESSING SYSTEM, STORAGE MEDIUM, AND INFORMATION PROCESSING METHOD

CROSS REFERENCE TO RELATED APPLICATIONS

This application is a continuation application of U.S. patent application Ser. No. 16/308,630, filed Dec. 10, 2018, now U.S. Pat. No. 11,003,894, which is a U.S. National Phase of International Patent Application No. PCT/JP2017/010393 filed on Mar. 15, 2017, which claims priority benefit of Japanese Patent Application No. JP 2016-126499 filed in the Japan Patent Office on Jun. 27, 2016. Each of the above-referenced applications is hereby incorporated herein by reference in its entirety.

TECHNICAL FIELD

The present disclosure relates to an information processing system, a storage medium, and an information processing method.

BACKGROUND ART

Conventionally, a technology of, in the case where one cannot remember a person's name or face in the daily life, supplementing information has been proposed. For example, Patent Literature 1 below describes a robot system that detects the degree of closeness on the basis of a conversation between a person and a user, and accordingly provides the person with user's privacy information.

In addition, Patent Literature 2 below describes a life support device for patients with brain dysfunction that displays a pseudo-face image of a close relative when talking on the phone with the close relative, and changes the pseudo-face image in a manner almost matching an interaction content to increase the degree of contribution to recovery of the brain function of the elderly with brain dysfunction.

CITATION LIST

Patent Literature

Patent Literature 1: JP 2014-176963A
Patent Literature 2: JP 2015-192844A

DISCLOSURE OF INVENTION

Technical Problem

However, the technology described in Patent Literature 1 above is intended merely for convenience. In addition, the technology described in Patent Literature 2 above is useful in the case where the brain dysfunction has already developed, and does not consider prevention of the brain dysfunction before development.

Therefore, the present disclosure proposes an information processing system, a storage medium, and an information processing method that can make a response to a user on the basis of an episode constructed from an interaction with the user to enhance the user's memory.

Solution to Problem

According to the present disclosure, there is provided an information processing system including: an accumulation section configured to accumulate episode data of a user; and a control section including an accumulation function of, when recognizing a specific user on a basis of sensor data acquired via an agent device, generating episode data in the accumulation section on a basis of a keyword extracted from the sensor data, generating a question for drawing out information concerning the episode data, and accumulating a reply from the specific user to the question in the episode data, and a responding function of, when recognizing the specific user on the basis of the sensor data acquired via the agent device, retrieving the generated episode data through the accumulation section on the basis of the keyword extracted from the sensor data, and generating response data concerning the retrieved episode data for the agent device to respond to the specific user.

According to the present disclosure, there is provided a storage medium having a program stored thereon for causing a computer to function as: an accumulation section configured to accumulate episode data of a user; and a control section including an accumulation function of, when recognizing a specific user on a basis of acquired sensor data, generating episode data in the accumulation section on a basis of a keyword extracted from the sensor data, generating a question for drawing out information concerning the episode data, and accumulating a reply from the specific user to the question in the episode data, and a responding function of, when recognizing the specific user on the basis of the acquired sensor data, retrieving the generated episode data from the accumulation section on the basis of the keyword extracted from the sensor data, and generating response data concerning the retrieved episode data for responding to the specific user.

According to the present disclosure, there is provided an information processing method including: accumulation processing in which, when recognizing a specific user on a basis of sensor data acquired via an agent device, a processor generates episode data in an accumulation section on a basis of a keyword extracted from the sensor data, generates a question for drawing out information concerning the episode data, and accumulates a reply from the specific user to the question in the episode data; and responding processing in which, when recognizing the specific user on the basis of the sensor data acquired via the agent device, the processor retrieves the generated episode data from the accumulation section on the basis of the keyword extracted from the sensor data, and generates response data concerning the retrieved episode data for the agent device to respond to the specific user.

Advantageous Effects of Invention

According to the present disclosure as described above, it is possible to make a response to a user on the basis of an episode constructed from an interaction with a user to enhance the user's memory.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram showing an example of question data accumulated in a question database according to an embodiment of the present disclosure.

FIG. 5 is a diagram showing an example of episode data accumulated in an episode database according to an embodiment of the present disclosure.

FIG. 6 is a diagram describing an example of person data accumulated in a person database according to an embodiment of the present disclosure.

FIG. 7 is a diagram describing an example of person data accumulated in a place database according to an embodiment of the present disclosure.

FIG. 12 is a diagram showing an example of episode data accumulated in an episode database according to the present variation.

MODE(S) FOR CARRYING OUT THE INVENTION

Figure 1:
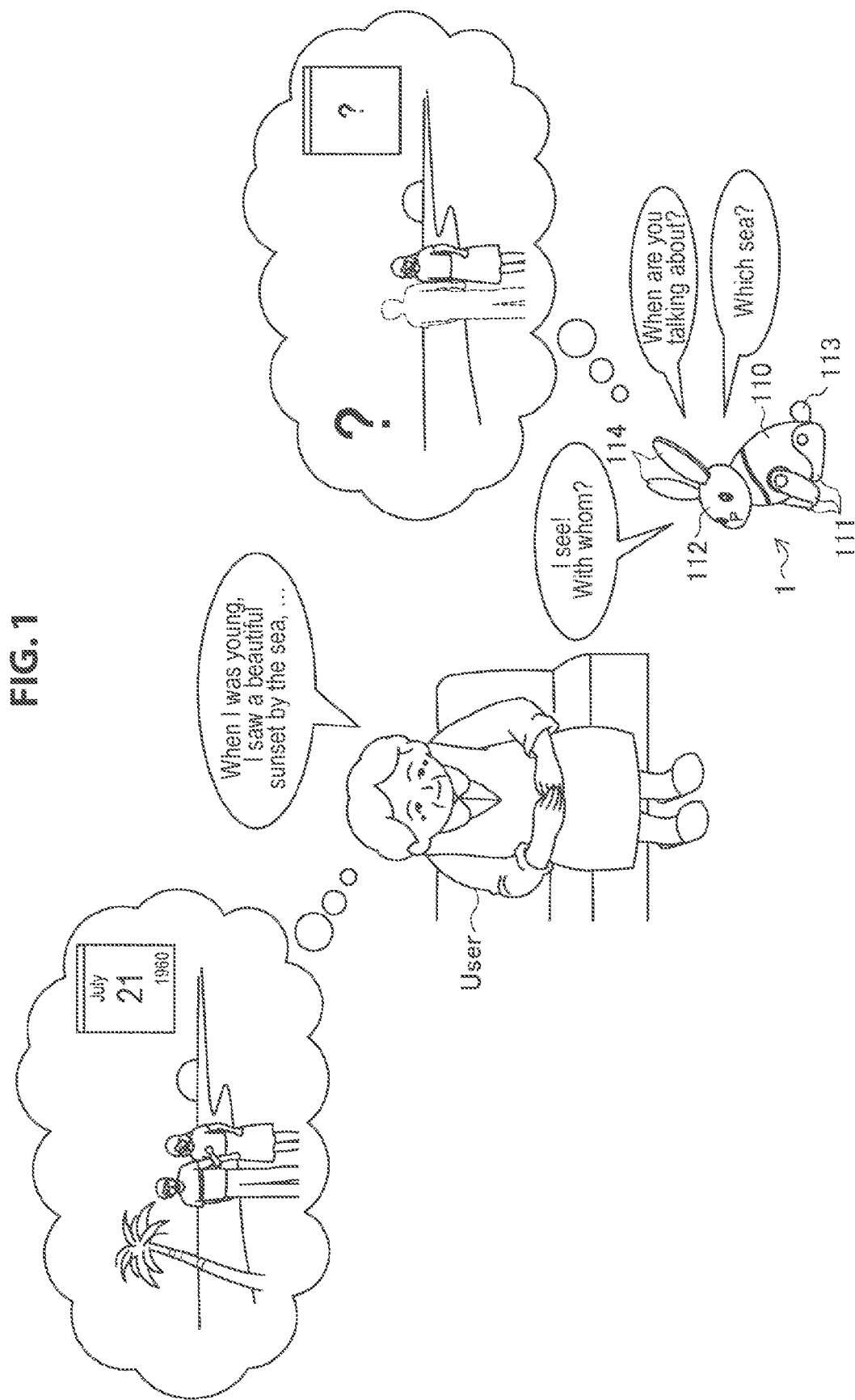
FIG. 1 is a diagram describing an overview of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.

1. Overview of information processing system according to an embodiment of the present disclosure
2. Configuration
3. Operation processing
3-1. Processing at the time of initial start-up
3-2. Processing at the time of accumulation
3-3. Processing at the time of utilization
4. Variation
4-1. Configuration
4-2. Operation processing (4-2-1. Processing at the time of accumulation)
(4-2-2. Processing at the time of utilization)
5. Supplement
6. Conclusion

1. OVERVIEW OF INFORMATION PROCESSING SYSTEM ACCORDING TO ONE EMBODIMENT OF PRESENT DISCLOSURE

First, an overview of an information processing system according to one embodiment of the present disclosure will be described. FIG. 1 is a diagram describing an overview of the information processing system according to the present embodiment. As shown in FIG. 1, the information processing system according to the present embodiment is implemented by a pet robot 1 (agent device) having an entertainment nature, whose appearance has a shape formed simulating an animal such as a rabbit. In addition, the pet robot 1 is capable of autonomously moving eyes, legs, and the like to exhibit animal-like behaviors.

BACKGROUND

Here, a technology intended for convenience of presenting information that a user cannot remember for supplementation and a technology that contributes to recovery of the brain function of the elderly have conventionally been proposed, whilst prevention of the brain dysfunction of the elderly before development in the daily life has not been particularly considered.

Therefore, in an information processing system according to the present embodiment, it is possible to enhance the user's memory in daily interactions with a pet robot 1 and prevent the brain dysfunction before development.

As shown in FIG. 1, for example, the pet robot 1 has conversations with the user in the daily life, and constructs episodes from user's uttered contents. Specifically, the pet robot 1 collects information regarding places, times, characters, events, and the like from the user's uttered contents to construct an episode database. For insufficient information, the pet robot 1 questions the user to collect information necessary for episode construction.

The pet robot 1 continually performs construction of such an episode database, and generates and outputs response data that recalls the user to a memory utilizing the constructed episode database. The present embodiment enhances the memory by reminding the user of an episode, and contributes to prevention of the brain dysfunction. An overview of the information processing system according to the present embodiment has been described above. Note that, in the present embodiment, the pet robot 1 is used as an example of the information processing device, whilst the present embodiment is not limited to this, but may be an imaginary pet displayed on a display terminal such as a tablet terminal or a smartphone, for example, that is, a tiny robot based on a software program.

Next, a configuration of the pet robot 1 which is an example of the information processing device according to the present embodiment will be specifically described with reference to FIG. 2.

2. Configuration

Figure 2:
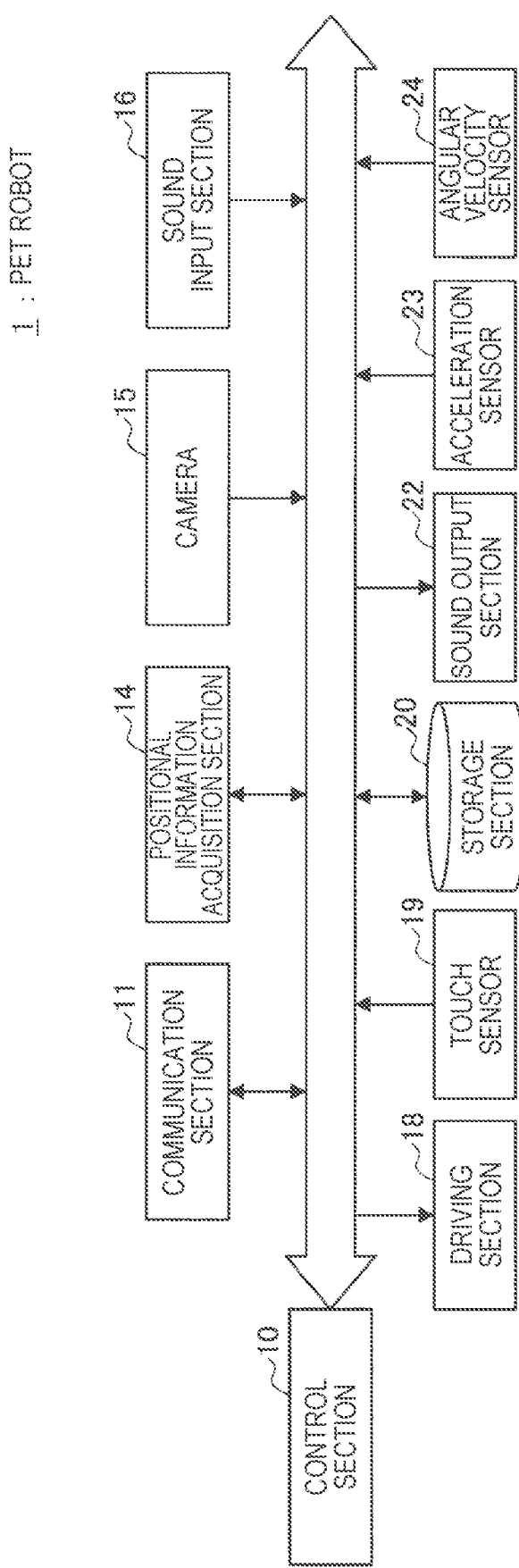
FIG. 2 is a block diagram showing an example of a configuration of a pet robot according to one embodiment of the present disclosure.

FIG. 2 is a block diagram showing an example of a configuration of the pet robot 1 according to the present embodiment. As shown in FIG. 2, the pet robot 1 has a control section 10, a communication section 11, a positional information acquisition section 14, a camera 15, a sound input section 16, a driving section 18, a touch sensor 19, a storage section 20, a sound output section 22, an acceleration sensor 23, and an angular velocity sensor 24.

The control section 10 functions as an arithmetic processing device and a control device, and controls the overall operations in the pet robot 1 in accordance with various programs. The control section 10 is implemented by, for example, an electronic circuit such as a central processing unit (CPU) or a microprocessor. In addition, the control section 10 may include a read only memory (ROM) that stores programs, operation parameters, and the like to be used and a random access memory (RAM) that temporarily stores parameters and the like varying as appropriate.

In addition, the control section 10 according to the present embodiment may perform autonomous control of automatically operating in accordance with various types of information obtained from the communication section 11, the positional information acquisition section 14, the camera 15, the sound input section 16, the touch sensor 19, the acceleration sensor 23, the angular velocity sensor 24, or the like.

The communication section 11 is a communication module for transmitting/receiving data to/from another device. For example, the communication section 11 is connected to various types of servers via a network (not shown) to transmit/receive data, or is directly connected to a peripheral device (not shown) by Bluetooth (registered trademark) or Wi-Fi (registered trademark) to transmit/receive data. The positional information acquisition section 14 has the function of sensing the current position of the pet robot 1 on the basis of an externally acquired signal. Specifically, the positional information acquisition section 14, for example, is implemented by a global positioning system (GPS) positioning section, and receives radio waves from a GPS satellite to sense the position where the pet robot 1 is present, and outputs the sensed positional information to the control section 10. In addition, the positional information acquisition section 14 may sense the position through transmission/reception to/from Wi-Fi, Bluetooth, mobile phone, PHS, smartphone, or the like, for example, or near-field communication or the like, besides the GPS.

The camera 15 has a lens system including an imaging lens, an aperture, a zoom lens, a focus lens, and the like, a driving system that causes the lens system to perform a focusing operation and a zooming operation, a solid-state image sensor array that photoelectrically converts imaged light obtained by the lens system to generate an imaging signal, and the like. The solid-state image sensor array may be implemented by, for example, a charge coupled device (CCD) sensor array or a complementary metal oxide semiconductor (CMOS) sensor array.

The sound input section 16 collects a user's voice or an ambient environmental sound, and outputs a sound signal to the control section 10. The sound input section 16 is implemented by a microphone, a microphone amplifier section that subjects a sound signal obtained with the microphone to amplification processing, and an A/D converter for subjecting the sound signal to digital conversion, and outputs the sound signal to the control section 10.

The driving section 18 is a functional module for achieving the degree of freedom at each joint of the pet robot 1, and includes a plurality of driving units provided respectively for axes such as roll, pitch, and yaw at each joint. Each of the driving units includes a combination of a motor that performs a rotation operation about a predetermined axis, an encoder that detects a rotated position of the motor, and a driver that adaptively controls the rotated position and rotational speed of the motor on the basis of the output of the encoder.

The touch sensor 19 detects a pressure applied by a physical action from the user, such as "patting" or "clapping". Note that the pet robot 1 may have a pressure sensor instead of or in addition to the touch sensor 19.

The storage section 20 stores programs for the control section 10 to execute various types of processing, and the like. In addition, the storage section 20 includes a storage device including a storage medium, a recording device that records data on the storage medium, a readout device that reads out data from the storage medium, a deletion device that deletes data recorded on the storage medium, and the like.

The sound output section 22 is implemented by a speaker and an amplifier circuit for that speaker. In addition, the sound output section 22 outputs a sound such as a cry.

The acceleration sensor 23 and the angular velocity sensor 24 detect the orientation and motion acceleration of the pet robot 1.

The configuration of the pet robot 1 according to the present embodiment has been specifically described above. Note that the configuration of the pet robot 1 according to the present embodiment is not limited to the example shown in FIG. 2. For example, the pet robot 1 may use the above-described camera 15 as a distance sensor for measuring the distance to an object positioned ahead, or may be separately provided with a distance sensor through use of a system of infrared rays or the like.

In addition, the pet robot 1 may include a body unit 110, leg units 111 respectively coupled to the front, back, left, and right of the body unit 110, and a head unit 112 and a tail unit 113 respectively coupled to the front end and the back end of the body unit 110, and an ear unit 114 coupled to the head unit 112 as shown in FIG. 1, for example. In the body unit 110, the control section 10 formed by connecting a central processing unit (CPU), a dynamic random access memory (DRAM), a flash read only memory (ROM), a personal computer (PC) card interface circuit, and a signal processing circuit to one another via an internal bus and a battery as a power source of the pet robot 1 are stored. In addition, in the body unit 110, the communication section 11, the positional information acquisition section 14, the storage section 20, the acceleration sensor 23, the angular velocity sensor 24, and the like are also stored.

In addition, in the head unit 112, the camera 15 for imaging an external situation, the touch sensor 19 for detecting a pressure applied by a physical action from the user, such as "patting" or "clapping", the sound input section 16 for collecting external sounds, the sound output section 22 for outputting a sound such as a cry, a distance sensor (not shown) for measuring the distance to an object positioned ahead, and the like are arranged at predetermined positions, respectively. The sound input section 16 may be installed in the ear unit 114 coupled to the head unit 112. The camera 15 may be provided at a position equivalent to an "eye" of the pet robot 1. In addition, the camera 15 may be arranged in the forehead portion of the head unit 112, and a light emitting diode (LED) (not shown) may be arranged at a position equivalent to an "eye".

Further, actuators and potentiometers of the number of degrees of freedom are placed at a joint portion of each of the leg units 111, each coupled portion between each of the leg units 111 and the body unit 110, a coupled portion between the head unit 112 and the body unit 110, a tail coupled portion of the tail unit 113, an ear coupled potion of the ear unit 114, and the like, respectively. For example, the actuator has a servo motor as a component. The leg units 111 are controlled by driving of the servo motor to transition to a target attitude or operation.

Regarding a specific configuration example of the pet robot 1 described above, a reference may be made to JP 2002-157596A, for example. The entire contents of JP 2002-157596A are hereby incorporated by reference.

In addition, the configuration of the pet robot 1 described with reference to FIG. 2 is also applicable to the case in which the pet robot 1 is a tiny robot. Specifically, a display terminal displaying the tiny robot has components equivalent to a display section, that is, the above-described control section 10, the communication section 11, the positional information acquisition section 14, the camera 15, the sound input section 16, the touch sensor 19, the storage section 20, and the sound output section 22. The tiny robot is displayed on the display section, and may interact with the user.

(Functional Configuration)

Figure 3:
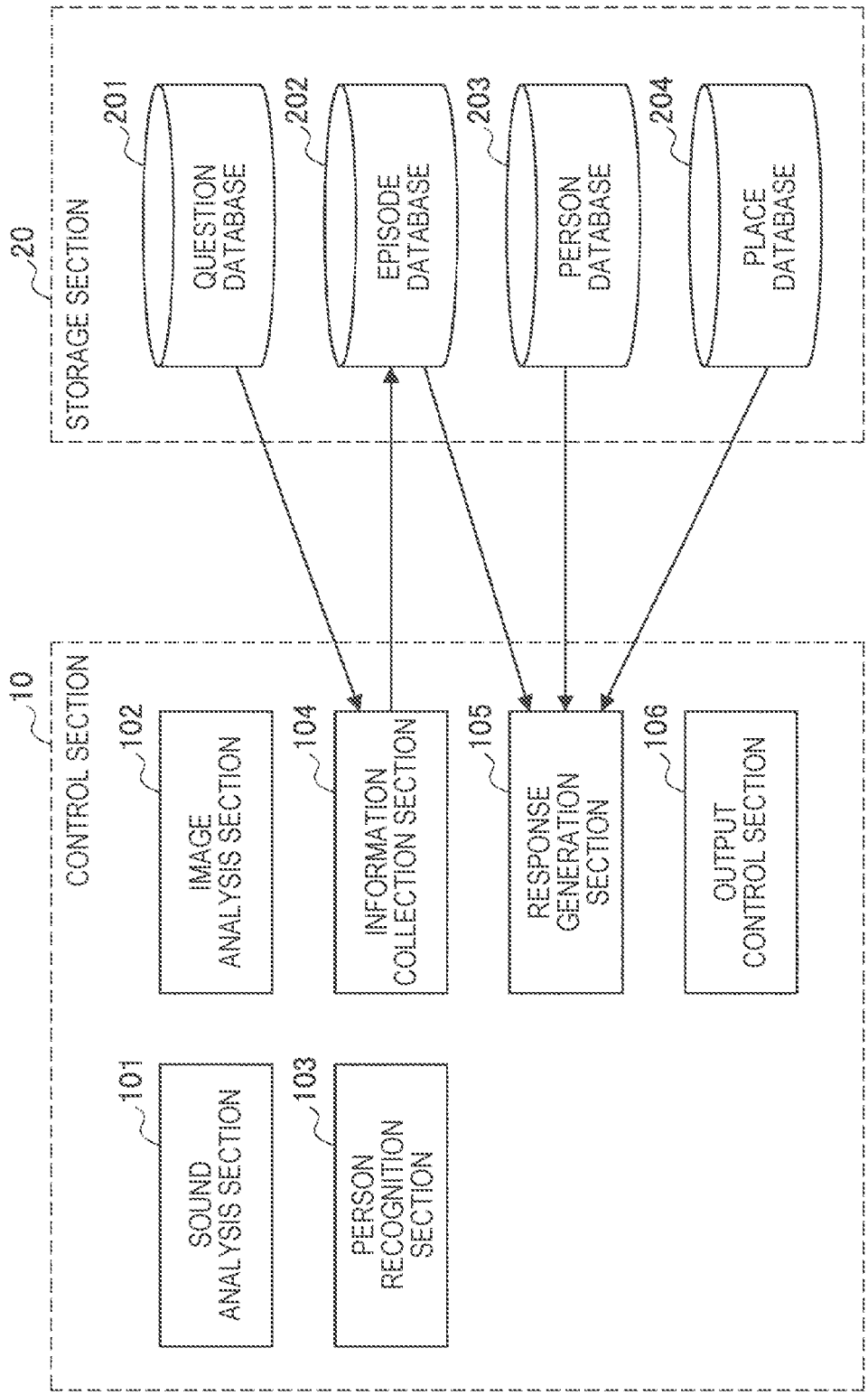
FIG. 3 is a block diagram showing a functional configuration example of a control section and a storage section according to one embodiment of the present disclosure.

Next, a functional configuration of the control section 10 and the storage section 20 will be described with reference to FIG. 3. FIG. 3 is a block diagram showing a functional configuration example of the control section 10 and the storage section 20 according to an embodiment of the present disclosure. In the drawing, a sound analysis section 101, an image analysis section 102, a person recognition section 103, an information collection section 104, a response generation section 105, and an output control section 106 are shown as functions of the control section 10 of the pet robot 1. In addition, in the drawing, a question database 201, an episode database 202, a person database 203, and a place database 204 are shown as functions of the storage section 20. Hereinafter, the respective structural elements will be described further.

The sound analysis section 101 converts a sound signal input from the sound input section 16 into text by sound recognition, and further performs a syntax analysis and a semantic analysis.

The image analysis section 102 analyzes a captured image captured by the camera 15. For example, the image analysis section 102 recognizes the user's face (calculates a facial feature quantity, or the like) from the captured image.

The person recognition section 103 recognizes a person talking to the pet robot 1 or a person present in the vicinity on the basis of sensor data acquired by the pet robot 1. For example, the person recognition section 103 performs person recognition on the basis of a result of analysis of a user's face image obtained by the image analysis section 102. Specifically, the person recognition section 103 subjects the face image and a person image registered in advance in the person database 203 to pattern matching to recognize who the person reflected in the captured image is. The person recognition is not limited to a captured image obtained by the camera 15, but a feature quantity of uttered voice analyzed by the sound analysis section 101, for example, and a voice feature quantity of each person registered in advance in the person database 203 may be compared for recognition. In addition, the person recognition section 103 may compare user's biological information (for example, fingerprints, palm prints, or the like) sensed by a biological sensor (not shown) provided for the pet robot 1 and biological information of each person registered in advance in the person database 203 for recognition.

The information collection section 104 has the function of collecting episode information from the user for accumulation in the episode database 202. For example, the information collection section 104 extracts a keyword from the content of user's uttered voice analyzed by the sound analysis section 101 to generate an episode. In addition, the information collection section 104 generates a question for further drawing out information concerning the episode from the user, and accumulates information acquired from a user's reply to the question in the episode database 202. For example, the information collection section 104 generates a question for filling each item of an episode set in advance. Such a question is generated with reference to the question database 201, for example.

Here, an example of question data accumulated in the question database 201 is shown in FIG. 4. In FIG. 4, a condition for a question for supplementing the content in the case where the content of an episode is insufficient or the like and a question sentence are accumulated in association with each other. In addition, a question ID is assigned to each question. In FIG. 4, examples of a question generated in the case of the initial start-up, a question generated in the case where there is no character in constructed episode data, a question generated in the case where there is no place in an episode, a question generated in the case where there is no date and time in an episode, a question generated in the case where the number of events concerning an episode is 0, a question generated in the case where the number of events is less than a predetermined number (for example, less than three) are shown.

In addition, in FIG. 4, examples of a positive utterance sentence ("And then?", "I see!", "Uh-huh", or the like) for prompting for a conversation with the user without particularly limiting the condition, and an utterance sentence ("He cried", "He had fun", or the like) that, using the case where the user has uttered a keyword indicating a specific emotion as a condition, is attuned to that emotion are also shown.

The information collection section 104 generates question data for the user using question data accumulated in the question database 201 as shown in FIG. 4. The question data may be combined with a noun included in immediately preceding user's utterance. For example, in the case where the user utters that "Today, I'm going to talk to you about those days when my son was little", the information collection section 104 generates a question ("When are you talking about?") for the case where there is no date and time in an episode in order to supplement date-and-time information since the date and time of the episode are unclear as "those days when my son was little". On this occasion, the information collection section 104 may combine question data with the noun "those days when he was little". Specifically, for example, the information collection section 104 generates question data such as "Those days when he was little, right. When are you talking about?" The generated question sentence data is output by sound from the sound output section 22, for example, with the output control section 106.

Next, an example of episode data accumulated in the episode database 202 will be described with reference to FIG. 5. As shown in FIG. 5, episode data includes items of characters, a place, a date and time, an event, and media data, for example, and an episode ID is assigned to each episode.

In the item of characters, information regarding persons appearing in the episode is registered. Since information regarding persons is managed here by the person database 203 as an example, person IDs (P01, P02, and the like) assigned in the person database 203 are registered in the item of characters in the episode database 202.

In the item of place, information regarding a place where the episode happens is registered. Since information regarding a place is managed here by the place database 204 as an example, a place ID (A01, A02, or the like) assigned in the place database 204 is registered in the item of place in the episode database 202.

In the item of date and time, date-and-time information of the episode is registered. In FIG. 5, for example, years such as 1965 and 1970 are registered.

In the item of event, a specific event in the episode is registered. In FIG. 5, for example, text indicating the course of an event or episode, such as "He played with a ball", "He used to cry because the ball he had missed rolled far", and "I bought him ice cream and went home eating it", is registered on the basis of user utterance.

In the item of media data, music data, image data (a still image or moving image), MIDI data, link information to a Web site on relevant information, and the like related to the episode are registered. As the media data, a captured image that the user showed the pet robot 1 when collecting information to be captured by the camera 15, acoustic data to which the user had the pet robot 1 listen and collected from the sound input section 16, data retrieved via the Internet with a keyword of an event about which the user has talked, and the like are assumed, for example.

Note that the items of episode data shown in FIG. 5 described above are mere examples, and the present embodiment is not limited to this.

Then, an example of person data accumulated in the person database 203 will be described with reference to FIG. 6. As shown in FIG. 6, the person data includes items of name, date of birth, relation, image, and the like, for example, and a person ID (P01, P02, or the like) is assigned to each piece of person data. The person data may be data collected by the pet robot 1 from an interaction with the user in an initial stage, or may be data input by the user through an operation input section (not shown), such as a keyboard or a touch panel display, provided for the pet robot 1. The item of "relation" is a data item indicating the relationship with a user set as an owner. In the case of a plurality of owners, for example, a "family", there are a plurality of family members themselves, and may therefore be registered using names such as "grandfather", "grandmother", "father", "mother", "daughter", "son", "grandchild", and the like, respectively.

Next, an example of person data accumulated in the place database 204 will be described with reference to FIG. 7. As shown in FIG. 7, the place data includes items of name, type, latitude and longitude, and the like, for example, and a place ID (A01, A02, or the like) is assigned to each piece of place data.

Then, the response generation section 105 in the functional configuration of the control section 10 will be described.

The response generation section 105 generates response data for reminding (recalling) the user of (to) information concerning an episode on the basis of episode data constructed in the episode database 202. Specifically, when a specific user talking to the pet robot 1 is recognized, for example, the response generation section 105 searches for an episode on the basis of a keyword extracted from user's uttered content collected by the sound input section 16, and generates response data concerning one of items in the retrieved episode data. For example, in the case where the specific user utters that "Tomorrow I'm going to C park", the response generation section 105 searches for an episode on the basis of the keyword "C park" extracted from the uttered content. In the case where episode data concerning "C park" is found, the response generation section 105 generates response data that awakens a memory concerning "C park" in the specific user, such as "C park is where you visited last month with your son, isn't it?", on the basis of the episode data (for example, information regarding characters and date and time). In addition, the response generation section 105 may generate media data in the episode data as response data. In this manner, it is possible to naturally awaken a user's distant memory during a conversation between the user and the pet robot 1, and enhance the memory to prevent the brain dysfunction.

The output control section 106 exerts control so as to output by sound the generated question data or response data from the sound output section 22. Note that, in the case where the pet robot 1 has a display section (not shown), the output control section 106 may output question data or response data converted into text from the display section, or may output image data included in question data or response data. In addition, the output control section 106 may output question data or response data from the communication section 11 to peripheral equipment. In addition, in the case where the pet robot 1 has a projection section (not shown), the output control section 106 is also capable of exerting control so as to project text or an image from the projection section.

The functional configuration of the control section 10 and the storage section 20 according to the present embodiment has been specifically described above. Next, operation processing of the information processing system according to the present embodiment will be described with reference to FIG. 8 to FIG. 10.

3. Operation Processing

3-1. Processing at the Time of Initial Start-Up

Figure 8:
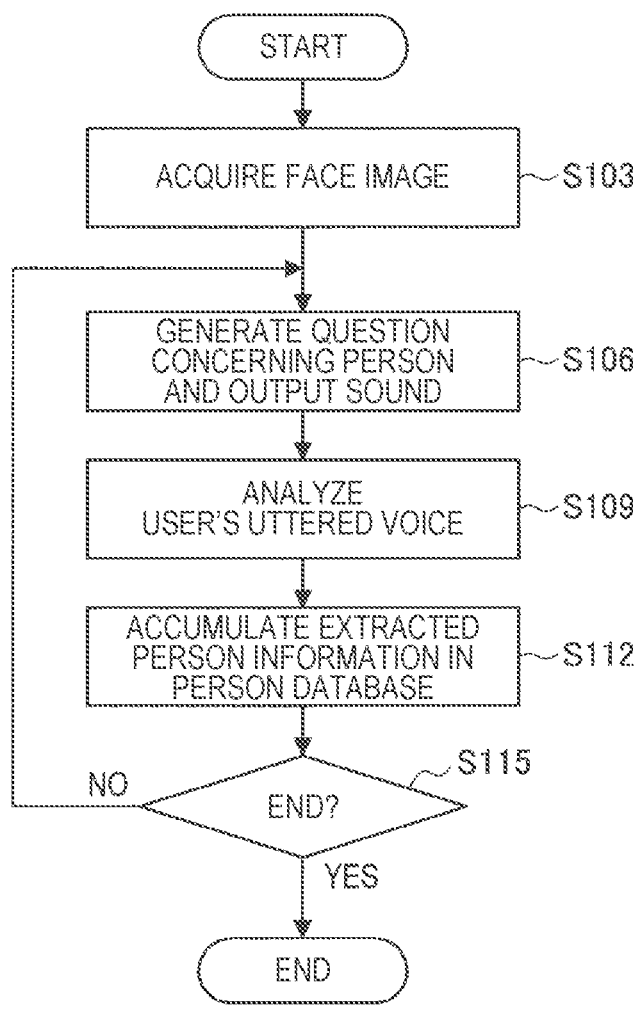
FIG. 8 is a flowchart showing processing at the time of initial start-up according to an embodiment of the present disclosure.

FIG. 8 is a flowchart showing processing at the time of initial start-up according to the present embodiment. As shown in FIG. 8, the control section 10 of the pet robot 1 first acquires a face image of a person currently present in the vicinity from a captured image captured by the camera 15 (step S103). The face image is newly registered in the person database 203.

Next, the control section 10 generates, with the information collection section 104, a question (a question on the condition of "at the time of initial start-up") concerning the person with reference to the question database 201, and outputs sound from the sound output section 22 with the output control section 106 (step S106).

Then, the sound analysis section 101 analyzes user's uttered voice in response to the above-described question (step S109).

Next, the information collection section 104 accumulates information concerning the person extracted from the user's uttered voice in the person database 203 on the basis of a sound analysis result (step S112).

Then, the control section 10 repeats the above-described steps S106 to S112 until the respective items of person information are questioned through, for example (step S115). Note that the repetitive processing may be terminated in the case where person information has not been obtained from the user.

An example of a conversation between the pet robot 1 and the user at the time of initial start-up based on the processing described above will be indicated below in chronological order.

The pet robot 1 "Nice to meet you. What is your name?"
The user A "Yoneko Sakurada"

(The information collection section 104 of the pet robot 1 newly registers a captured face image of the user A in the person database 203, and further registers "Name, Surname: Sakurada", "Name, First name: Yoneko", and "Relation: herself".)

The pet robot 1 "Yoneko, what should I call you?"

The user A "You can call me Yone."

(The information collection section 104 registers "Nickname: Yone" in the person database 203.)

The pet robot 1 "When is your birthday, Yone?"

The user A "It's July 8th."

The pet robot 1 "How old are you, Yone?"

The user A "I'm 80."

(The information collection section 104 calculates the date of birth from the age and the current date (for example, 2016), and registers "Date of birth: Jul. 8, 1936".) The pet robot 1 "Thank you, Yone!"

3-2. PROCESSING AT THE TIME OF ACCUMULATION

Figure 9:
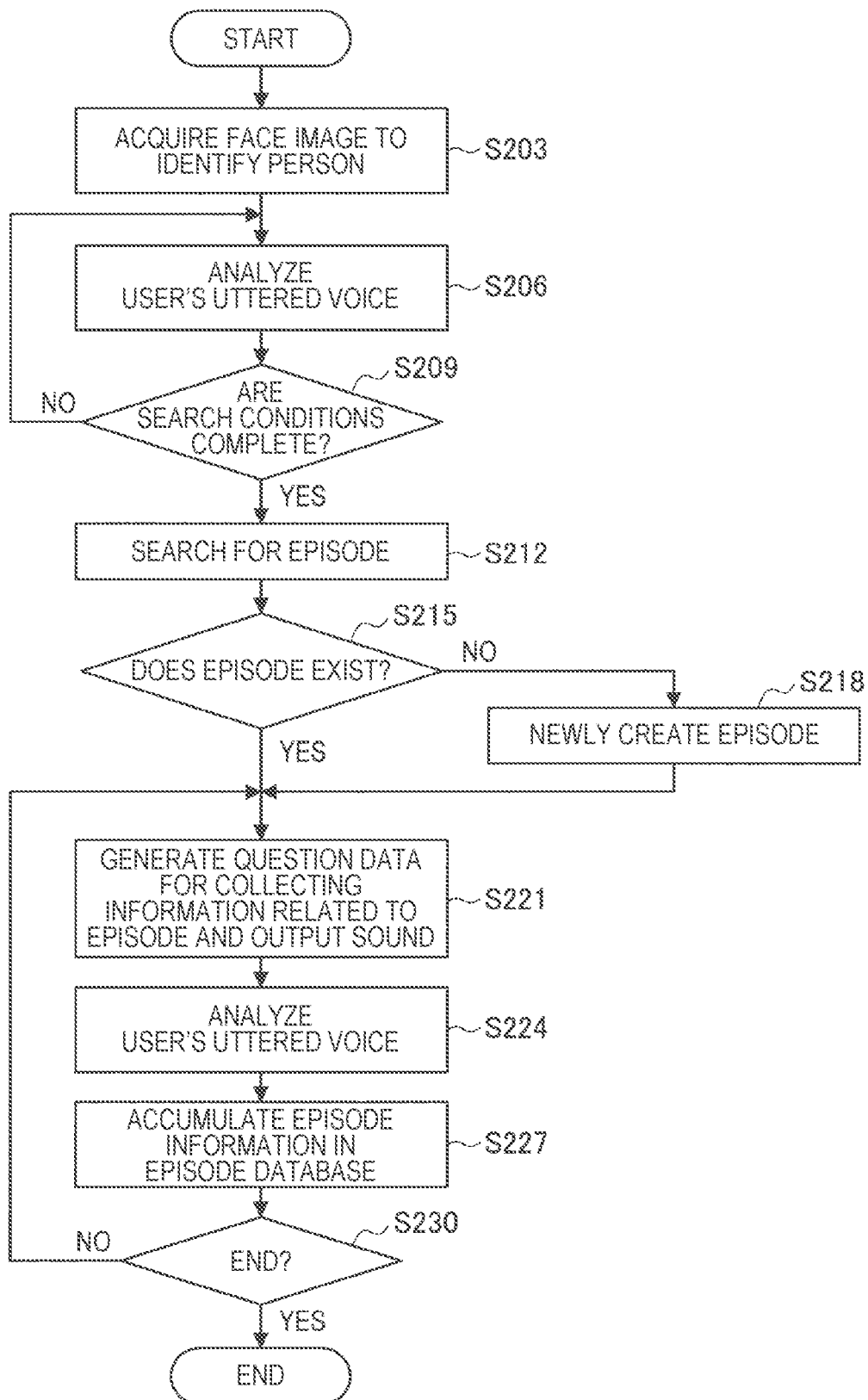
FIG. 9 is a flowchart showing processing at the time of episode accumulation according to an embodiment of the present disclosure.

FIG. 9 is a flowchart showing processing at the time of episode accumulation according to the present embodiment. As shown in FIG. 9, the control section 10 of the pet robot 1 first acquires a face image of a user present in the vicinity from a captured image captured by the camera 15, and performs person identification with reference to the person database 203 (step S203).

Next, the sound analysis section 101 analyzes user's uttered voice (step S206).

Then, the information collection section 104 determines whether or not conditions for searching for an episode on the basis of an analysis result are complete (step S209). The episode search conditions include information regarding a person, place, and date and time, for example, and the information collection section 104 generates question data for obtaining information necessary for searching according to necessity. Note that the episode search conditions are not limited to this, but may be information regarding at least any of person, place, and date and time, or may be a keyword concerning an event.

Next, in the case where the search conditions are complete (step S209/Yes), the information collection section 104 searches for an episode that satisfies the conditions from the episode database 202 on the basis of the search conditions (step S212). Then, in the case where an episode that satisfies the conditions does not exist (step S215/No), the information collection section 104 creates a new episode (assigns an episode ID, and the like) in the episode database 202 (step S218).

Next, in the case where the episode already exists (step S215/Yes), or after creating a new episode (step S218), the control section 10 generates question data for collecting information related to the episode with the information collection section 104 with reference to the question database 201, and outputs the question data by sound from the sound output section 22 with the output control section 106 (step S221).

Next, the sound analysis section 101 analyzes user's uttered voice in response to the above-described question (step S224).

Then, the information collection section 104 accumulates information concerning an episode extracted from a sound analysis result in the episode database (step S227).

Then, the control section 10 repeats the above-described steps S221 to S227 until the items of episode information are completely filled, for example (for example, "three or more events" or the like) (step S230). In addition, the information collection section 104 acquires media data related to the episode by capturing a picture or the like that the user has shown during a conversation with the camera 15, acquiring music that the user has played with the sound input section 16, or acquiring data from a network on the basis of a keyword that the user has uttered. For example, in the case where the user has uttered that "I was asked 'What is that white mountain?'", the information collection section 104 registers the latitude and longitude of the place of the episode and an image of Mount Fuji acquired by searching with "white mountain" as media data in correlation with the text. Note that the repetitive processing may be terminated in the case where the user starts talking about another topic or in the case where episode information has not been obtained.

An example of a conversation between the pet robot 1 and the user at the time of episode accumulation based on the processing described above will be indicated below in chronological order.

The user A "Today, I'm going to talk to you about those days when my son was little."

The pet robot 1 "Those days when he was little, right. When are you talking about?" The user A "Maybe about a preschool age."

(When it is recognized that a user having talked to is the user A as the owner, the information collection section 104 generates question data of "When are you talking about?" in order to acquire "date and time" in the episode search conditions. On this occasion, the information collection section 104 may generate question data such as "Those days when he was little, right. When are you talking about?" in combination with a keyword "those days when he was little" extracted from the immediately preceding user's uttered voice. Further, based on the information of "maybe about a preschool age" in the response of the user A and information regarding the date of birth (Jul. 8, 1960) of the son of the user A acquired from the person database 203, the information collection section 104 adds 2 to 5 to the year of birth considering the age (for example, 2 to 5) at which one can enter a "preschool" to obtain "1962 to 1965" as the search condition date and time. When the search conditions are complete, the information collection section 104 searches for an episode that agrees with the conditions of "person: herself (person ID: P01)", "person: son (person ID: P02)", and "date and time: 1962 to 1965". In the case where there is no episode, the information collection section 104 generates an episode (episode ID: E01) in which characters are herself and her son, and the date and time is 1962 to 1965.)

The pet robot 1 "A preschool age, right. Where are you talking about?"

The user A "C park."

The pet robot 1 "C park?"

The user A "It is a park located in the neighborhood."

(The information collection section 104 generates new place data (place ID: A01) whose name is "C park" and type is "park" in the place database 204.)

The pet robot 1 "A park in the neighborhood, right. What is the story?" (The information collection section 104 generates question data for asking about information concerning an event and outputs the question data by sound.)

The user A "My son liked playing with a ball. He used to play with a ball at C park."

The pet robot 1 "Uh-huh."

The user A "But he was not good at sport. He used to cry because the ball he had missed rolled far."

The pet robot 1 "He cried. And then?"

The user A "I felt sorry because he didn't stop crying, so I used to buy him ice cream and go home eating it."

(The information collection section 104 registers event information such as "playing with a ball", "He used to cry because the ball he had missed rolled far", "I used to buy him ice cream and go home eating it" extracted from the user's uttered voice. In addition, the information collection section 104 generates utterance that prompts for the conversation, such as "And then?" or "Uh-huh", or utterance attuned to the user's emotion, such as "He cried", during the conversation with the user.)

3-3. PROCESSING AT THE TIME OF UTILIZATION

Figure 10:
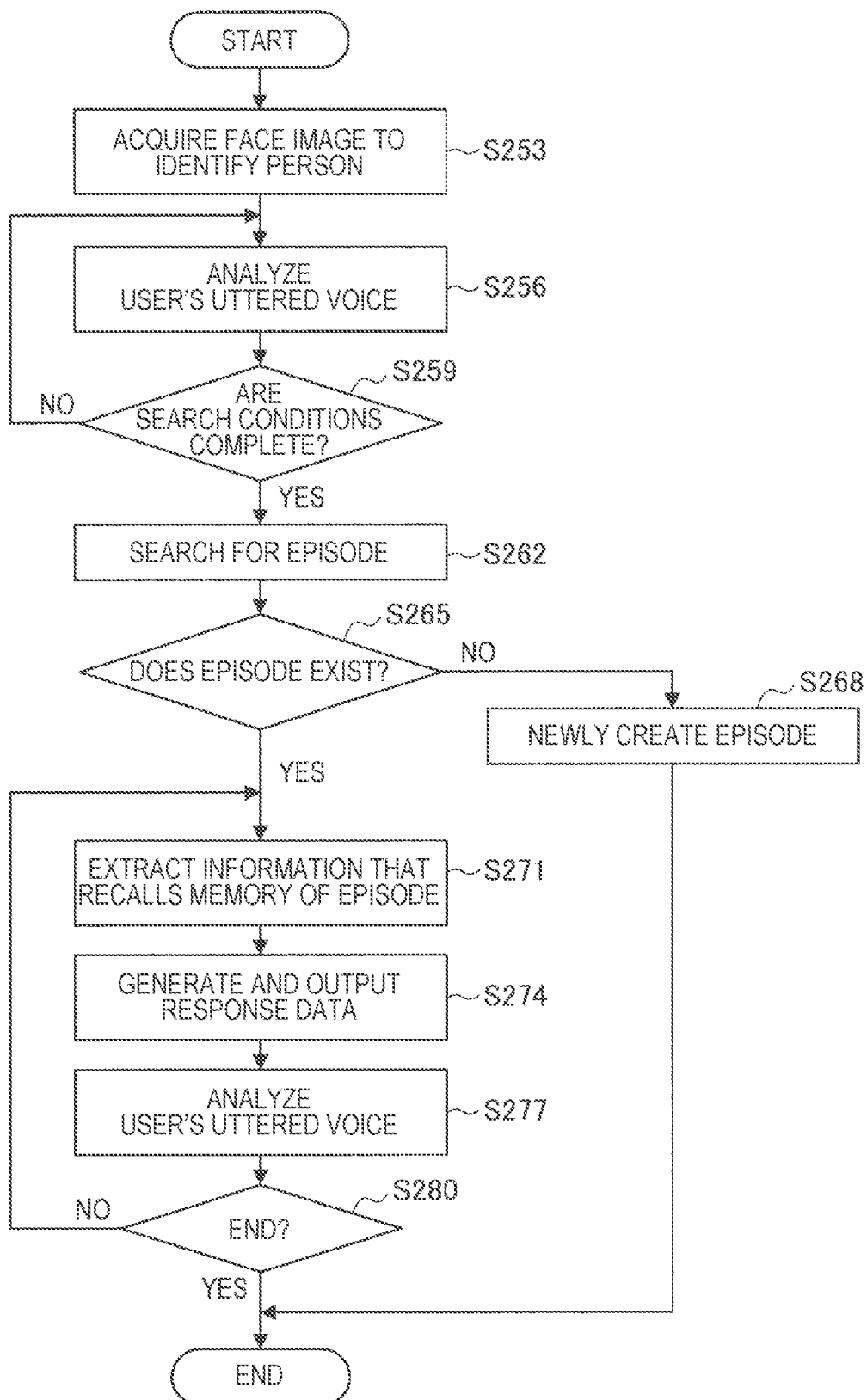
FIG. 10 is a flowchart showing processing at the time of episode utilization according to an embodiment of the present disclosure.

FIG. 10 is a flowchart showing processing at the time of episode utilization according to the present embodiment. As shown in FIG. 10, the control section 10 of the pet robot 1 first acquires a face image of a user present in the vicinity from a captured image captured by the camera 15, and performs person identification with reference to the person database 203 (step S253).

Next, the sound analysis section 101 analyzes user's uttered voice (step S256).

Then, the response generation section 105 determines whether or not conditions for searching for an episode are complete on the basis of an analysis result (step S259). The episode search conditions include, for example, information regarding a person (identification is performed by the above-described person identification), place, and date and time, and the response generation section 105 generates question data for obtaining information necessary for searching according to necessity.

Next, in the case where the search conditions are complete (step S259/Yes), the response generation section 105 searches for an episode that satisfies the conditions through the episode database 202 on the basis of the search conditions (person, place, date and time, and the like) (step S262).

Then, in the case where an episode that satisfies the conditions does not exist (step S265/No), an episode is newly created by the information collection section 104 in the episode database 202 (step S268). The processing of accumulating episode information when newly creating an episode is as shown in FIG. 9.

On the other hand, in the case where the episode already exists (step S265/Yes), the response generation section 105 extracts information that recalls (reminds) the user to (of) a memory of the episode from the episode data (step S271). On this occasion, the response generation section 105 may extract information from the episode data considering a sound analysis result of immediately preceding user's utterance. Accordingly, it is possible to avoid a topic overlapping the content of user's utterance, and to extract information close to the content of user's utterance.

Next, the response generation section 105 generates response data on the basis of the extracted information, and output of the generated response data is controlled by the output control section 106 (step S274). For example, the response generation section 105 selects a text at random from the item of event in episode data retrieved from the episode database 202, and generates response data for asking about part of the text. More specifically, on the basis of a text that "played with a ball" selected from the item of event of the retrieved episode data, the response generation section 105 generates response data of "What game did he play?", for example. In addition, the response generation section 105 may generate media extracted at random from the item of media in the retrieved episode data as response data. Data of each of media may be correlated with each text in the item of event, and the response generation section 105 may generate the text extracted from the item of event and media correlated with the text as response data.

Then, the sound analysis section 101 analyzes user's uttered voice in reply to the above-described response (step S277).

Then, the control section 10 terminates the processing in the case where the above-described steps S271 to S277 are repeated a predetermined number of times, for example (step S280). The repetitive processing may be terminated in the case where the user starts talking about another topic or in the case where a user's response cannot be obtained.

An example of a conversation between the pet robot 1 and the user at the time of episode utilization based on the processing described above will be indicated below in chronological order.

The user A "I took a trip the other day."

(The pet robot 1 identifies the user A by means of a captured image, and since a keyword "trip" related to the place of an episode has been uttered, generates and outputs response data for drawing out a specific place.)

The pet robot 1 "Where did you take a trip to?"

The user A "Lake D."

(Since a proper noun "Lake D" related to the place of an episode has been uttered, the pet robot 1 searches for an episode through the episode database with "Lake D" and the user A herself (person ID: P01). Since the son (person ID: P02) of the user A has been registered as a character in episode data (episode ID: E02) found as a result of the search, the pet robot 1 brings up the topic of "son".)

The pet robot 1 "Lake D is where you have visited with your son, isn't it?"

The user A "Oh! You are right."

(Since there is no particular keyword to respond to, the pet robot 1 makes a response by reproducing the song "Sea" registered in the item of media in the episode data.)

The pet robot 1 "Your son sang this song, didn't he?"

The user A " . . . Yeah, he maybe mistook Lake D for the sea. He was singing loudly on the cruise ship, and everyone was looking back at him with a smile."

(Since there is no particular keyword to respond to, the pet robot 1 makes a response by reproducing an image of Mount Fuji retrieved from the text of the item of event in the episode data and registered through the display section or projection section (not shown).)

The pet robot 1 "Was the view like this?"

The user A "Well . . . , m, Mount Fuji? I saw it. Speaking of which, it seems like my son was saying something looking at Mount Fuji . . . I feel like I was asked about the name of Mount Fuji."

(By presenting media data in this manner, it is possible to recall the user A to a memory more vividly.)

4. VARIATION

The present embodiment is not limited to the above-described example, but it is also possible to sense a user's emotion at the time of episode accumulation and utilization to be utilized for construction of episode data and a recalling response. For example, it is possible to increase the sympathy by attuning the pet robot 1 to the user's emotion when constructing episode data, and to make it easier to collect episode information. In addition, when utilizing an episode, it is possible to give a user the sense of happiness, and to enhance the memory more effectively by using an episode having a positive emotion. Hereinafter, specific description will be provided with reference to FIG. 11 to FIG. 14.

4-1. CONFIGURATION

Figure 11:
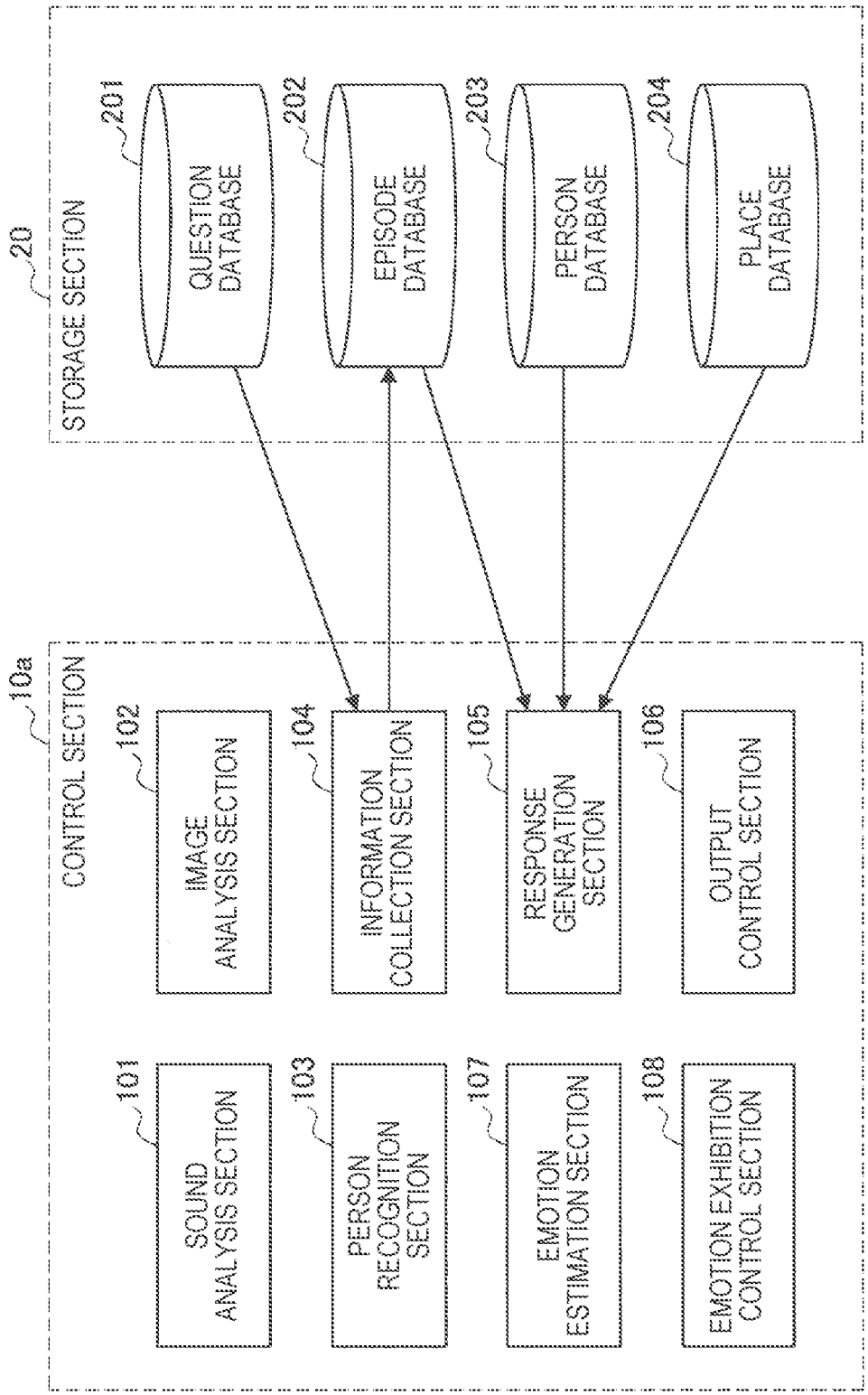
FIG. 11 is a block diagram showing a functional configuration example of a control section and a storage section of a pet robot according to a variation of an embodiment of the present disclosure.

FIG. 11 is a block diagram showing a functional configuration example of a control section 10a and the storage section 20 of the pet robot 1 according to the present variation. In the drawing, the sound analysis section 101, the image analysis section 102, the person recognition section 103, the information collection section 104, the response generation section 105, the output control section 106, an emotion estimation section 107, and an emotion exhibition control section 108 are shown as functions of the control section 10a of the pet robot 1. In addition, in the drawing, the question database 201, the episode database 202, the person database 203, and the place database 204 are shown as the functions of the storage section 20.

The emotion estimation section 107 estimates a user's emotion from a captured image or collected voice of the user. For example, the emotion estimation section 107 recognizes the expression from a user's face image captured by the camera 15 to estimate the emotion. In addition, the emotion estimation section 107 subjects user's uttered voice input through the sound input section 16 to a spectrum analysis or the like to estimate the emotion.

The information collection section 104 registers a user's emotion when collecting episode information from the user in the episode database 202 as the item of emotion of an episode. An emotion to be registered may be expressed by a basic expression such as "pleasure or sorrow", for example, or may be expressed in a two-dimensional space of "valence" and "arousal". Here, an example of episode data accumulated in the episode database 202 according to the present variation is shown in FIG. 12. In the example shown in FIG. 12, in the item of emotion in each piece of episode data, a user's emotion value when collecting episode data is expressed one-dimensionally as "valence" by 0 (aversion) to 1 (preference).

The emotion exhibition control section 108 exerts control so as to exhibit an emotion attuned to the user's emotion estimated by the emotion estimation section 107 by a motion, voice, or the like of the pet robot 1. Emotion exhibition control may be performed both when collecting episode data and utilizing an episode. For example, when the pet robot 1 exhibits that it has the same feeling as the user to show sympathy when the user is talking about an episode, it is expected that the user is talking further about the episode. Specifically, in the case where the pet robot 1 has a shape simulating a dog, the emotion exhibition control section 108, for example, exerts control so as to wag the tail strongly when the emotion value is 1 (preference), and to lower the tail without wagging when the emotion value is 0 (aversion). In addition, in the case where the pet robot 1 has a shape simulating a rabbit, the emotion exhibition control section 108 exerts control so as to turn the ears toward the user and raise the ears upright when the emotion value is 1 (preference), produce a small motion such as jumping when the emotion value is approximately 1, and lop the ears and stamp the legs when the emotion value is 0 (aversion).

4-2. OPERATION PROCESSING

Next, operation processing of the present variation will be described with reference to FIG. 13 to FIG. 14.

4-2-1. PROCESSING AT THE TIME OF ACCUMULATION

Figure 13:
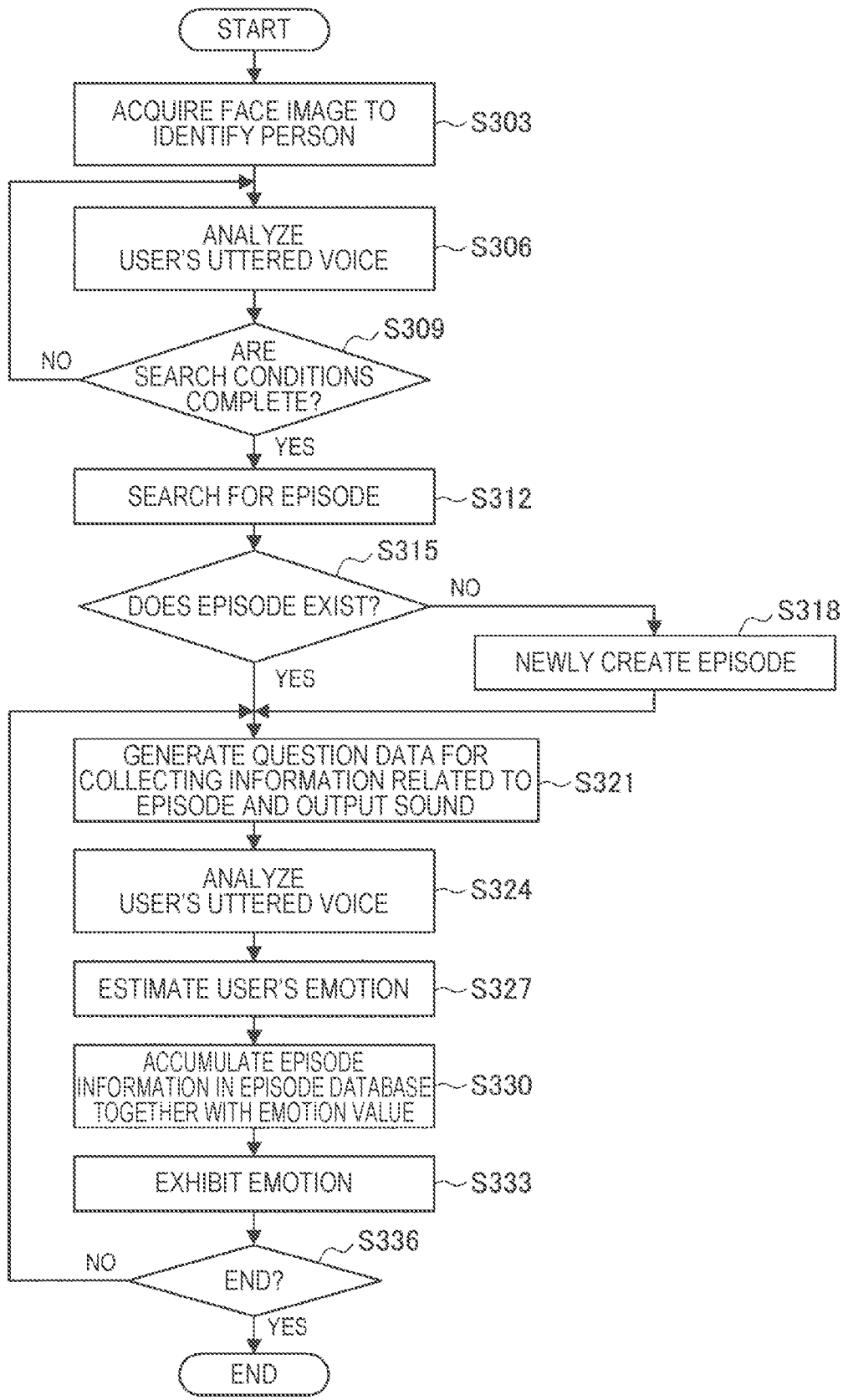
FIG. 13 is a flowchart showing processing at the time of episode accumulation according to the present variation.

FIG. 13 is a flowchart showing processing at the time of episode accumulation according to the present variation. As shown in FIG. 13, the control section 10 of the pet robot 1 first acquires a face image of a user present in the vicinity from a captured image captured by the camera 15, and performs person identification with reference to the person database 203 (step S303).

Next, the sound analysis section 101 analyzes user's uttered voice (step S306).

Then, the information collection section 104 determines whether or not conditions for searching for an episode are complete on the basis of an analysis result (step S309). The episode search conditions include information regarding a person, place, and date and time, for example, and the information collection section 104 generates question data for obtaining information necessary for searching according to necessity.

Next, in the case where the search conditions are complete (step S309/Yes), the information collection section 104 searches for an episode that satisfies the conditions through the episode database 202 on the basis of the search conditions (step S312).

Then, in the case where an episode that satisfies the conditions does not exist (step S315/No), the information collection section 104 newly creates an episode (assigns an episode ID, and the like) in the episode database 202 (step S318).

Next, in the case where the episode already exists (step S315/Yes), or after newly creating an episode (step S318), the control section 10 generates question data for collecting information related to the episode with the information collection section 104 with reference to the question database 201, and outputs the question data by sound from the sound output section 22 with the output control section 106 (step S321).

Next, the sound analysis section 101 analyzes user's uttered voice in response to the above-described question (step S324).

Then, the emotion estimation section 107 estimates a user's emotion on the basis of an analysis of the captured image and voice (step S327).

Next, the information collection section 104 accumulates information concerning an episode extracted from the sound analysis result in the episode database together with an emotion value indicating the estimated user's emotion (step S330). Note that the information collection section 104 registers an average value, for example, of the recognized emotion value as an emotion value of the episode.

Next, the emotion exhibition control section 108 exerts control so as to exhibit an emotion attuned to the user's emotion with a motion or voice of the pet robot 1 (step S333). For example, in the case where the user's emotion value is 1 (preference), the emotion exhibition control section 108 turns the ears of the pet robot 1 toward the user and raises the ears upright, jumps, or the like to exhibit a positive emotion and further prompt the user to talk. On the other hand, in the case where the user's emotion value is 0 (aversion), the emotion exhibition control section 108 exhibits a negative emotion by lowering the ears and keeping quiet or the like to show consideration for the user's feeling.

Then, for the above-described steps S321 to S333, the control section 10 repeats questions for collecting episode information until the items of episode information are completely filled unless the user's emotion value does not fall below 0.5, for example (step S336). For example, in the case where the user's emotion value falls below 0.5, it is determined that the user has a negative emotion about the episode, and since the user is highly unlikely to want to talk about this episode, the pet robot 1 terminates episode accumulation processing.

An example of a conversation between the pet robot 1 and the user at the time of episode accumulation based on the processing described above will be indicated below in chronological order.

The user A "Today, I'm going to talk to you about those days when my son was little."
The pet robot 1 "Those days when he was little, right. When are you talking about?"
The user A "Maybe about a preschool age."
(When it is recognized that a user having talked to is the user A as the owner, the information collection section 104 generates question data of "When are you talking about?" in order to acquire the "date and time" of the episode search conditions. Similarly to the above-described example, "1965" is set as the search condition date and time on the basis of the information of "about a preschool age" and the information of the date of birth of the son of the user A. The information collection section 104 searches for an episode that agrees with the conditions of "person: herself (person ID: P01)", "person: son (person ID: P02)", and "date and time: 1965", and in the case where there is no such episode, generates a new episode (episode ID: E01).)
The pet robot 1 "At a preschool age. Where are you talking about?"
The user A "C park."
The pet robot 1 "C park?"
The user A "It is a park located in the neighborhood."
(The information collection section 104 generates new place data (place ID: A01) whose name is "C park" and type is "park" in the place database 204.)
The pet robot 1 "A park in the neighborhood. What is the story?"
The user A "My son liked playing with a ball. He used to play with a ball at Himawari park."
The pet robot 1 "Uh-huh."
The user A "But he was not good at sport. He used to cry because the ball he had missed rolled far."
The pet robot 1 "He cried. And then?"
The user A "I felt sorry because he didn't stop crying, so I used to buy him ice cream and go home eating it."
(When recognizing that the user A smiles while talking about the episode, the pet robot 1 turns the ears toward the user A uprightly and jumps or the like in agreement with the user's pleasant emotion to exhibit a positive emotion. Further, the pet robot 1 repeats a keyword extracted from the immediately preceding user's utterance in order to further prompt the user A to talk.)
The pet robot 1 "Ice cream!"
The user A "You are interested in this story. By the way, I let him have ice cream only in the summer. I had let him have ice cream after it got cool. Then he had stomach upset, and it was terrible."
(In this manner, when the pet robot 1 exhibits an emotion that sympathizes with the user's talk, it is possible to further prompt the user A to talk about the episode.)

4-2-2. PROCESSING AT THE TIME OF UTILIZATION

Figure 14:
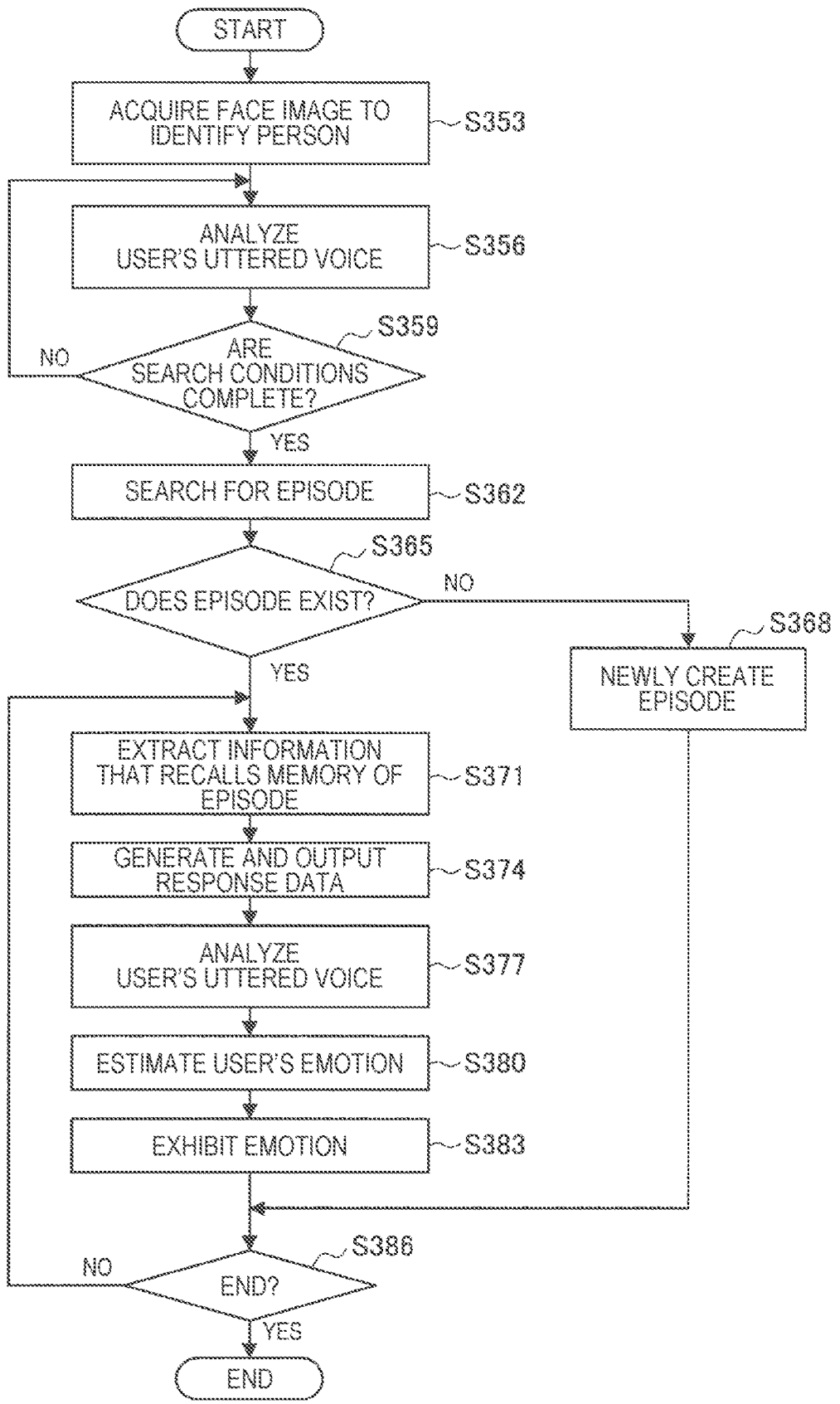
FIG. 14 is a flowchart showing processing at the time of episode utilization according to the present variation.

FIG. 14 is a flowchart showing processing at the time of episode utilization according to the present variation. As shown in FIG. 14, the control section 10 of the pet robot 1 first acquires a face image of a user present in the vicinity from a captured image captured by the camera 15, and performs person identification with reference to the person database 203 (step S353).

Next, the sound analysis section 101 analyzes user's uttered voice (step S356).

Then, the response generation section 105 determines whether or not the conditions for searching for an episode are complete on the basis of an analysis result (step S359). The episode search conditions include, for example, information regarding a person (identification is performed by the above-described person identification), place, and date and time, and the response generation section 105 generates question data for obtaining information necessary for searching according to necessity.

Next, in the case where the search conditions are complete (step S359/Yes), the response generation section 105 searches for an episode that satisfies the conditions through the episode database 202 on the basis of the search conditions (person, place, date and time, and the like) (step S362). On this occasion, the response generation section 105 searches only for an episode with a positive emotion (pleasant emotion) whose emotion value is more than or equal to 0.5, for example.

Then, in the case where an episode that satisfies the conditions does not exist (step S365/No), an episode is newly created by the information collection section 104 in the episode database 202 (step S368). Processing of accumulating episode information when newly creating an episode is as shown in FIG. 13.

On the other hand, in the case where the episode already exists (step S365/Yes), the response generation section 105 extracts information that recalls (reminds) the user to (of) a memory of the episode from the episode data (step S371).

Next, the response generation section 105 generates response data on the basis of the extracted information, and output of the generated response data is controlled by the output control section 106 (step S374). As described above, since only an episode having a positive emotion whose emotion value is more than or equal to 0.5 is searched for to generate response data, the pet robot 1 is capable of enhancing the memory while giving the user the sense of happiness.

Then, the sound analysis section 101 analyzes user's uttered voice in reply to the above-described response (step S377).

Next, the emotion estimation section 107 estimates a user's emotion on the basis of an analysis of the captured image and voice (step S380).

Then, the emotion exhibition control section 108 controls the motion and sound of the pet robot 1 so as to be attuned to the user's emotion to exhibit an emotion (step S383).

Then, the control section 10 terminates the processing in the case where the above-described steps S371 to S383 are repeated a predetermined number of times, for example (step S386). Note that the repetitive processing may be terminated in the case where the user starts talking about another topic, in the case where a user's response cannot be obtained, or in the case where the user's emotion value falls below 0.5 to turn negative.

An example of a conversation between the pet robot 1 and the user at the time of episode utilization based on the processing described above will be indicated below in chronological order.

The user A "I took a trip the other day."
(The pet robot 1 identifies the user A by means of a captured image, and since a keyword "trip" related to the place of an episode has been uttered, generates and outputs response data for drawing out a specific place.)

The pet robot 1 "Where did you take a trip to?"

The user A "Lake D."

(Since a proper noun "Lake D" related to the place of an episode has been uttered, the pet robot 1 searches for an episode with "Lake D" and the user A herself (person ID: P01) through the episode database. In episode data (episode ID: E02, ID: E03) found as a result of the search, since the emotion value of the episode ID: E02 is 0.8, and the emotion value of the episode ID: E03 is 0.1, episode data of the episode ID: E02 with a positive emotion is selected as an episode. Accordingly, it is possible to avoid selecting an episode with a negative emotion to offend the user A and stop the conversation with the user A. Since the son (person ID: P02) of the user A has been registered as a character in the episode data of the selected episode ID: E02, the pet robot 1 brings up a topic of "son".)

The pet robot 1 "Lake D is where you have visited with your son, isn't it?"

The user A "Oh! You are right."

(Since there is no particular keyword to respond to, the pet robot 1 makes a response by reproducing the song "Sea" registered in the item of media in the episode data.)

The pet robot 1 "Your son sang this song, didn't he?"

The user A " . . . Yeah, he maybe mistook Lake D for the sea. He was singing loudly on the cruise ship, and everyone was looking back at him with a smile."

(When recognizing that the user A smiles while remembering, the pet robot 1 exhibits a positive emotion by turning the ears toward the user A uprightly and jumping or the like in agreement with the user's pleasant emotion. Further, since there is no particular keyword to respond to, the pet robot 1 makes a response by reproducing an image of Mount Fuji retrieved from the text of the item of event in the episode data and registered through the display section or projection section (not shown).)

The pet robot 1 "Was the view like this?"

The user A "Huh? Are you happy too? Oh . . . , m, Mount Fuji? I saw it. Speaking of which, it seems like my son was saying something looking at Mount Fuji . . . I feel like I was asked about the name of Mount Fuji. I was convinced that we had took the trip in the summer, but I wonder if we went there in the autumn because Mount Fuji was covered with snow."

(By bringing up only an episode with a positive emotion as a topic and with a sympathetic reaction of the pet robot 1 in addition to presentation of media information, it is possible to recall a new memory, and to enhance the memory of the user A more effectively while giving the sense of happiness.)

5. SUPPLEMENT

In the above-described embodiment, the pet robot 1 alone performs episode accumulation and utilization (enhancement of the memory), whilst the present embodiment is not limited to this, but it is also possible to achieve the above-described processing on the server side. Hereinafter, description will be provided with reference to FIG. 15.

Figure 15:
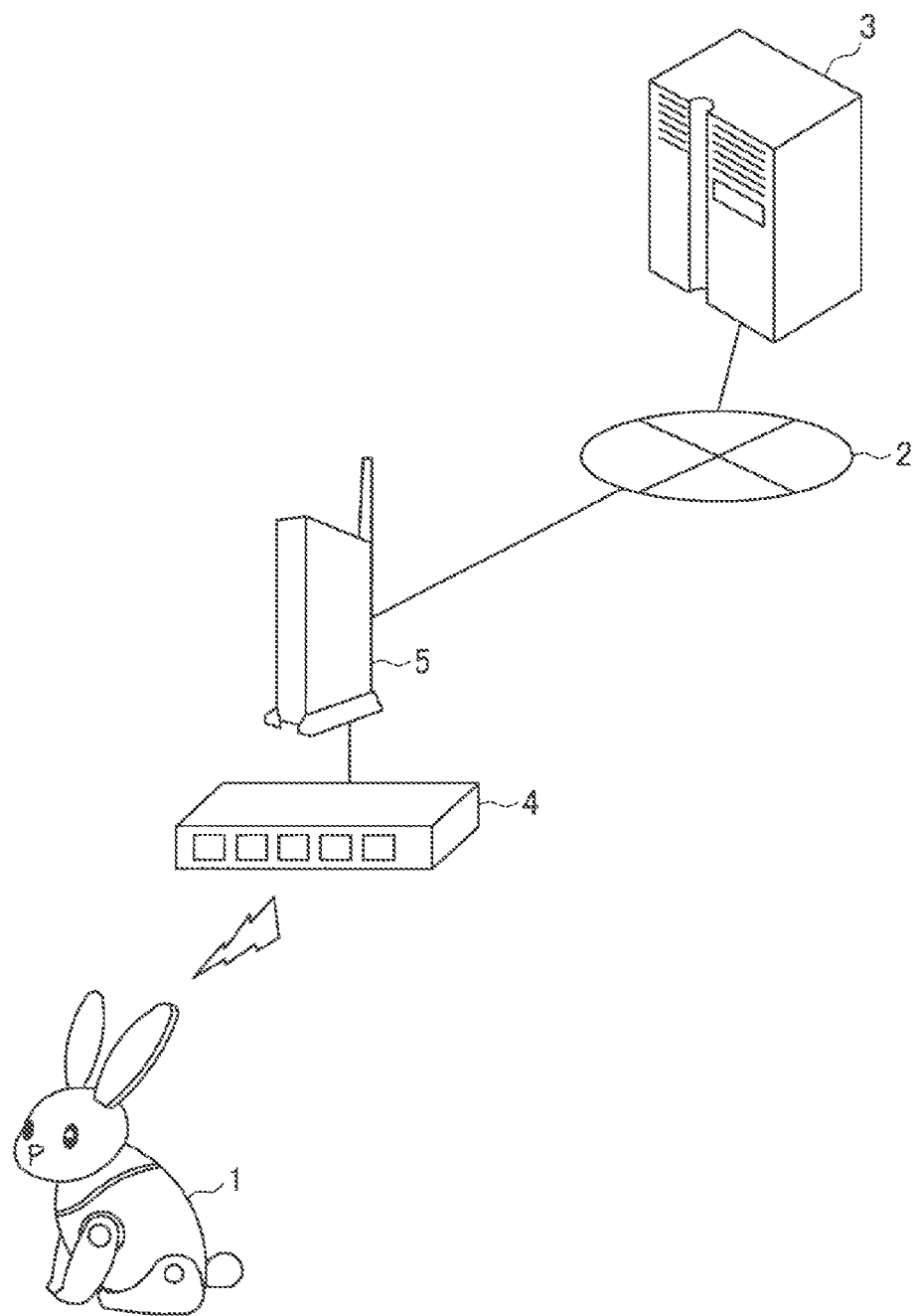
FIG. 15 is a diagram showing an example of a system configuration according to an embodiment of the present disclosure.

FIG. 15 is a diagram showing an example of a system configuration according to the present embodiment. As shown in FIG. 15, the pet robot 1 is capable of connecting to a router 4 wirelessly, and to a modem 5 connected to the router 4 and further to a network 2 via the modem 5 to connect to a server 3 on the network to perform data communication.

The pet robot 1 transmits user's uttered voice having been collected, a captured image having been captured, or the like to the server 3, and construction of episode data may be performed by the server 3. In addition, the pet robot 1 asks a question for collecting episode information or makes a response that recalls a memory of an episode to enhance the memory, in accordance with the control by the server 3.

The server 3 performs construction of episode data on the basis of various types of data transmitted from the pet robot 1. In addition, the server 3 exerts control so as to cause the pet robot 1 to present, to the user, a question for collecting episode information or a response that recalls a memory of an episode to enhance the memory. Here, a configuration example of the server 3 will be described specifically with reference to FIG. 16.

Figure 16:
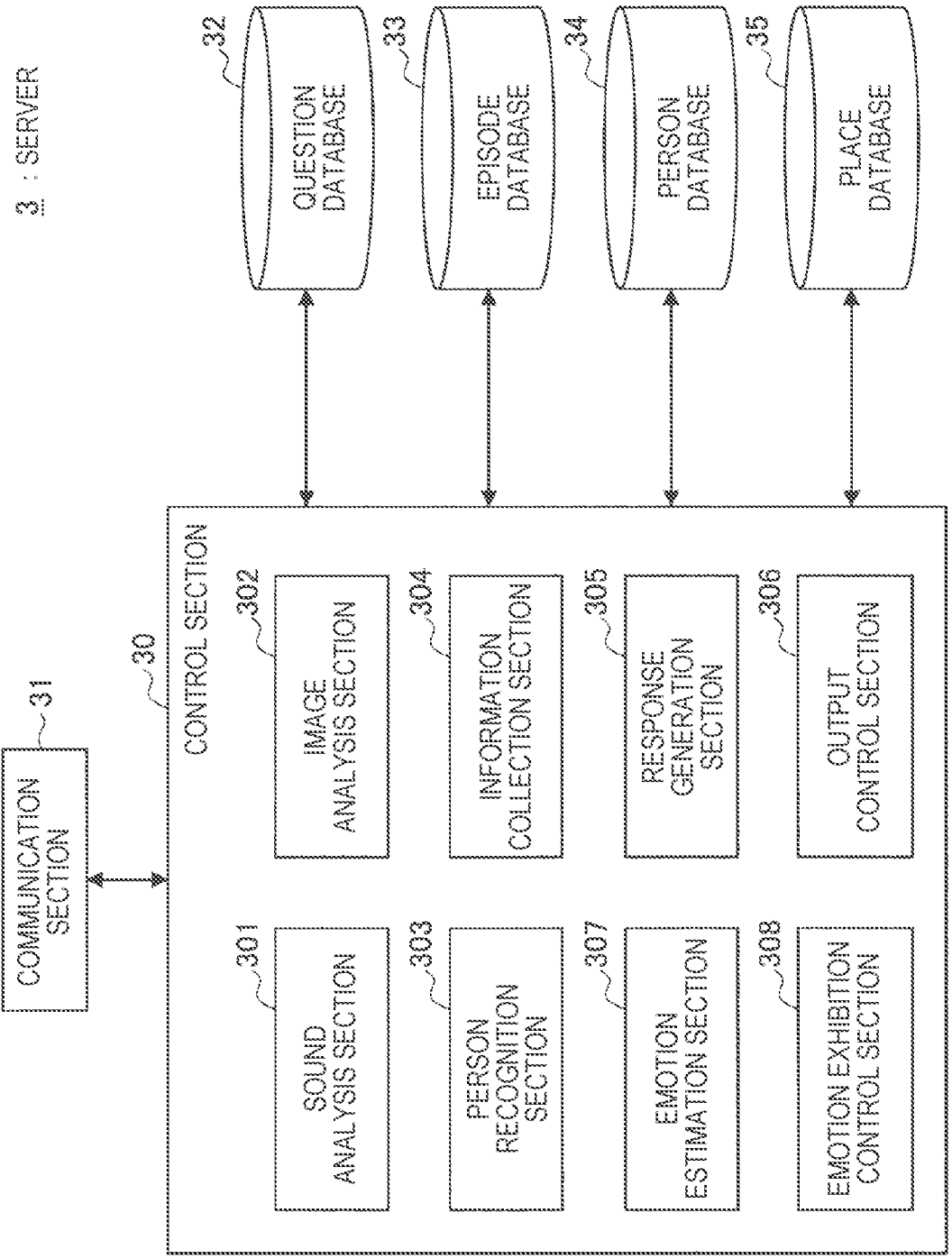
FIG. 16 is a block diagram showing an example of a configuration of a server according to an embodiment of the present disclosure.

FIG. 16 is a block diagram showing an example of a configuration of the server 3 according to the present embodiment. As shown in FIG. 16, the server 3 has a control section 30, a communication section 31, a question database 32, an episode database 33, a person database 34, and a place database 35.

The communication section 31 is a communication module for performing data transmission/reception to/from another device. For example, the communication section 31 connects to the pet robot 1 via the network 2, and performs data transmission/reception.

The control section 30 functions as an arithmetic processing device and a control device, and controls the overall operations in the server 3 in accordance with various programs. The control section 30 is implemented by, for example, an electronic circuit such as a CPU or a microprocessor. In addition, the control section 30 may include a ROM that stores programs, operation parameters, and the like to be used and a RAM that temporarily stores parameters and the like varying as appropriate.

In addition, the control section 30 according to the present embodiment functions as a sound analysis section 301, an image analysis section 302, a person recognition section 303, an information collection section 304, a response generation section 305, an output control section 306, an emotion estimation section 307, and an emotion exhibition control section 308. Note that the function of each of the structural elements is similar to the same configuration described with reference to FIG. 11.

In this manner, the information processing system according to the present embodiment may include the pet robot 1 and the server 3.

6. CONCLUSION

As described above, in the information processing system according to an embodiment of the present disclosure, it is possible to make a response to a user on the basis of an episode constructed from an interaction with the user to enhance the user's memory.

In addition, in consideration of a user's emotion, it is also possible to promote a conversation about an episode about which the user has a positive emotion to enhance a memory of the episode, and exert emotion exhibition control for the pet robot 1 so as to be attuned to the user's emotion. Accordingly, in the present embodiment, it is possible to collect episode information and enhance the memory while giving the user the sense of happiness.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to generate a computer program for causing the functions of the pet robot 1 and the server 3 to be exerted in hardware such as a CPU, ROM, and RAM included in the pet robot 1 and the server 3 of the above-described information processing system. In addition, a computer-readable storage medium having the computer program stored thereon is also offered.

Further, the effects described in this specification are merely illustrative or exemplified effects, and are not limitative. That is, with or in the place of the above effects, the technology according to the present disclosure may achieve other effects that are clear to those skilled in the art from the description of this specification. Additionally, the present technology may also be configured as below.

(1)

An information processing system including:
  an accumulation section configured to accumulate episode data of a user; and
  a control section including
  an accumulation function of,
  when recognizing a specific user on a basis of sensor data acquired via an agent device, generating episode data in the accumulation section on a basis of a keyword extracted from the sensor data,
  generating a question for drawing out information concerning the episode data, and accumulating a reply from the specific user to the question in the episode data, and a responding function of,
  when recognizing the specific user on the basis of the sensor data acquired via the agent device,
  retrieving the generated episode data through the accumulation section on the basis of the keyword extracted from the sensor data, and
  generating response data concerning the retrieved episode data for the agent device to respond to the specific user.

(2)

The information processing system according to (1), in which the control section generates response data concerning one of items in the retrieved episode data.

(3)

The information processing system according to (1) or (2), in which the control section generates video and/or sound data associated with the retrieved episode data as the response data.

(4)

The information processing system according to any one of (1) to (3), in which an emotion of the specific user when accumulating the episode data is accumulated in the accumulation section in association with the episode data, and
  the control section retrieves episode data from the accumulation section on a basis of a keyword extracted from the sensor data and an emotion associated with each piece of episode data.

(5)

The information processing system according to (4), in which the control section retrieves a piece of episode data from pieces of episode data with which positive emotions have been associated among pieces of episode data accumulated in the accumulation section on the basis of the keyword extracted from the sensor data.

(6)

The information processing system according to any one of (4) to (5), in which the control section
  recognizes an emotion of the specific user from the sensor data, and generates control data for causing the agent device to exhibit an emotion identical to a result of the recognition.

(7)

The information processing system according to any one of (1) to (6), in which when recognizing the specific user on a basis of acquired sensor data, the control section retrieves episode data from the accumulation section on the basis of the keyword extracted from the sensor data,
  generates a question for further drawing out information to be accumulated in the retrieved episode data, and
  accumulates a reply from the specific user to the question in the episode data.

(8)

The information processing system according to (7), in which
  the control section generates a question for drawing out an item in which information has not yet been stored among items in the retrieved episode data.

(9)

The information processing system according to (7) or (8), in which the control section
  recognizes an emotion of the specific user from the sensor data detected when the specific user is making a reply, and
  accumulates the reply from the specific user in the episode data, and accumulates the emotion in the accumulation section in association with the episode data.

(10)

The information processing system according to any one of (7) to (9), in which the control section generates control data for causing the agent device to exhibit an emotion identical to a result of the recognition.

(11)

The information processing system according to any one of (1) to (10), in which the control section
  recognizes the specific user on a basis of face image data as the sensor data captured by an imaging section, and
  retrieves episode data from the accumulation section on a basis of a keyword recognized from sound data serving as the sensor data acquired by a sound input section.

(12)

The information processing system according to (11), in which
  the information processing system is the agent device, and
  the information processing system further includes
  the imaging section,
  the sound input section, and
  a sound output section configured to output response data concerning the retrieved episode data by sound.

(13)

The information processing system according to any one of (1) to (11), including:
  a communication section configured to
  receive sensor data acquired by the agent device, and
  transmit response data concerning the retrieved episode to the agent device.

(14)

The information processing system according to any one of (1) to (13), in which the control section generates response data for causing the user to recall a memory concerning the episode data.

(15)

The information processing system according to any one of (1) to (14), in which the control section generates an item of at least any of a date and time, a place, a character, an event, and media data as an item to be accumulated in the episode data.

(16)

The information processing system according to (15), in which the control section retrieves the generated episode data from the accumulation section on a basis of a keyword concerning the date and time, the place, the character, or the event extracted from uttered voice data of the user.

(17)

A storage medium having a program stored thereon for causing a computer to function as:

an accumulation section configured to accumulate episode data of a user; and a control section including an accumulation function of, when recognizing a specific user on a basis of acquired sensor data, generating episode data in the accumulation section on a basis of a keyword extracted from the sensor data, generating a question for drawing out information concerning the episode data, and accumulating a reply from the specific user to the question in the episode data, and a responding function of, when recognizing the specific user on the basis of the acquired sensor data, retrieving the generated episode data from the accumulation section on the basis of the keyword extracted from the sensor data, and generating response data concerning the retrieved episode data for responding to the specific user.

(18)

An information processing method including:

accumulation processing in which, when recognizing a specific user on a basis of sensor data acquired via an agent device, a processor generates episode data in an accumulation section on a basis of a keyword extracted from the sensor data, generates a question for drawing out information concerning the episode data, and accumulates a reply from the specific user to the question in the episode data; and responding processing in which, when recognizing the specific user on the basis of the sensor data acquired via the agent device, the processor retrieves the generated episode data from the accumulation section on the basis of the keyword extracted from the sensor data, and generates response data concerning the retrieved episode data for the agent device to respond to the specific user.

REFERENCE SIGNS LIST 1 pet robot
2 network
3 server
4 router
5 modem
10 control section
11 communication section
14 positional information acquisition section
15 camera
16 sound input section
18 driving section
19 touch sensor
20 storage section
22 sound output section
23 acceleration sensor
24 angular velocity sensor
30 control section
31 communication section
32 question database
33 episode database
34 person database
35 place database
101 sound analysis section
102 image analysis section
103 person recognition section
104 information collection section
105 response generation section
106 output control section
107 emotion estimation section
108 emotion exhibition control section
201 question database
202 episode database
203 person database
204 place database
301 sound analysis section
302 image analysis section
303 person recognition section
304 information collection section
305 response generation section
306 output control section
307 emotion estimation section
308 emotion exhibition control section

What is claimed is:

1. An information processing system, comprising:
at least one processor coupled to a storage device, the at least one processor configured to:
recognize a first user based on sensor data acquired via a device;
generate episode data in the storage device based on a keyword extracted from the sensor data;
determine a condition to draw out information associated with the episode data, wherein the condition includes a missing piece of content in the episode data;
generate a first question to draw out the information associated with the episode data, wherein the first question is generated based on the missing piece of content in the episode data;
accumulate, in the episode data, a first reply from the first user to the first question and an emotion, of the first user, associated with the episode data;
retrieve the episode data from the storage device, based on the keyword extracted from the sensor data and the emotion, of the first user, associated with the episode data is a positive emotion; and
generate response data associated with the retrieved episode data for the device to respond to the first user.

2. The information processing system according to claim 1, wherein the at least one processor is further configured to:
determine a number of a plurality of events in the episode data; and
generate a second question based on the determination that the number of the plurality of events is less than a threshold number.

3. The information processing system according to claim 1, wherein the at least one processor is further configured to generate the response data associated with one of a plurality of items in the episode data.

4. The information processing system according to claim 1, wherein the at least one processor is further configured to generate, as the response data, at least one of video data or sound data associated with the episode data.

5. The information processing system according to claim 1, wherein the emotion of the first user is associated with a piece of a plurality of pieces of the episode data.

6. The information processing system according to claim 5, wherein
the at least one processor is further configured to retrieve a piece of the episode data from the plurality of pieces of the episode data based on the keyword extracted from the sensor data, and
the piece of the episode data is associated with the positive emotion of a plurality of positive emotions.

7. The information processing system according to claim 5, wherein the at least one processor is further configured to:
recognize the emotion of the first user from the sensor data; and
generate control data to cause the device to exhibit the emotion identical to a result of the recognition.

8. The information processing system according to claim 1, wherein the at least one processor is further configured to:
generate a second question to draw out the information to be accumulated in the episode data; and
accumulate, in the episode data, a second reply from the first user to the second question.

9. The information processing system according to claim 8, wherein the at least one processor is further configured to generate a third question to draw out an item of a plurality of items in which the information is not stored in the retrieved episode data.

10. The information processing system according to claim 8, wherein the at least one processor is further configured to:
recognize the emotion of the first user from the sensor data at a time of the second reply of the first user.

11. The information processing system according to claim 10, wherein the at least one processor is further configured to control data to cause the device to exhibit the emotion identical to a result of the recognition.

12. The information processing system according to claim 1, wherein the at least one processor is further configured to:
recognize the first user based on face image data as the sensor data captured by an imaging section; and
retrieve the episode data from the storage device based on the keyword recognized from sound data as the sensor data acquired by a sound input section and the emotion, of the first user, associated with the episode data is the positive emotion.

13. The information processing system according to claim 12, wherein
the information processing system is the device, and
the information processing system further comprises:
the imaging section;
the sound input section; and
a sound output section configured to output, by sound, the response data associated with the episode data.

14. The information processing system according to claim 1, further comprising a communication section configured to:
receive the sensor data by the device; and
transmit the response data associated with the episode data to the device.

15. The information processing system according to claim 1, wherein the at least one processor is further configured to generate the response data to cause the first user to recall a memory associated with the episode data.

16. The information processing system according to claim 1, wherein the at least one processor is further configured to generate an item of at least one of a date, a time, a place, a character, an event, or a media data to be accumulated in the episode data.

17. The information processing system according to claim 16, wherein the at least one processor is further configured to retrieve the episode data from the storage device based on the keyword associated with the date, the time, the place, the character, or the event extracted from uttered voice data of the first user and the emotion, of the first user, associated with the episode data is the positive emotion.

18. A non-transitory computer-readable medium having stored thereon computer-executable instructions that, when executed by a processor, cause the processor to execute operations, the operations comprising:
recognizing a user based on sensor data;
generating episode data in a storage device based on a keyword extracted from the sensor data;
determining a condition to draw out information associated with the episode data, wherein the condition includes a missing piece of content in the episode data;
generating a question to draw out the information associated with the episode data, wherein the question is generated based on the missing piece of content-place in the episode data;
accumulating, in the episode data, a reply from the user to the question and an emotion, of the user, associated with the episode data;
retrieving the episode data from the storage device, based on the keyword extracted from the sensor data and the emotion, of the user, associated with the episode data is a positive emotion; and
generating response data associated with the retrieved episode data to respond to the user.

19. An information processing method, comprising:
recognizing a user based on sensor data acquired via a device;
generating episode data in a storage device based on a keyword extracted from the sensor data;
determining a condition to draw out information associated with the episode data, wherein the condition includes a missing piece of content in the episode data;
generating a question to draw out the information associated with the episode data, wherein the question is generated based on the missing piece of content-place in the episode data;
accumulating, in the episode data, a reply from the user to the question and an emotion, of the user, associated with the episode data;
retrieving the episode data from the storage device based on the keyword extracted from the sensor data and the emotion, of the user, associated with the episode data is a positive emotion; and
generating response data associated with the retrieved episode data for the device to respond to the user.

20. The information processing system according to claim 1, wherein
the missing piece of the content includes a missing character in the episode data,
the missing character corresponds to a second user, and
the at least one processor is further configured to generate a second question based on the missing character that corresponds to the second user.

21. The information processing system according to claim 1, wherein
the missing piece of the content includes at least one of a missing place where an episode associated with the episode data has happened, a missing time at which the episode has happened, or a missing date at which the episode has happened, and the at least one processor is further configured to:
generate a second question, based on the at least one of the missing time or the missing date, prior to the generation of the first question; and
accumulate, in the episode data, a second reply from the first user to the second question, wherein
the second reply includes the at least one of the missing time or the missing date; and
the first question is generated based on the missing place and the second reply that includes the at least one of the missing time or the missing date.

* * * * *